(12) United States Patent
O'Keefe et al.

(10) Patent No.: US 8,967,019 B2
(45) Date of Patent: Mar. 3, 2015

(54) KNOB WITH LOCK MECHANISM

(75) Inventors: Colleen O'Keefe, New York, NY (US);
David E. Gaber, Hoboken, NJ (US);
Chi Wo Wong, New Territories (HK)

(73) Assignee: Designer Safety Knob, LLC, Hoboken, NJ (US)

( * ) Notice: Subject to any disclaimer, the term of this patent is extended or adjusted under 35 U.S.C. 154(b) by 880 days.

(21) Appl. No.: 12/889,734

(22) Filed: Sep. 24, 2010

(65) Prior Publication Data

US 2011/0072932 A1   Mar. 31, 2011

Related U.S. Application Data

(60) Provisional application No. 61/245,916, filed on Sep. 25, 2009.

(51) Int. Cl.
*G05G 1/10* (2006.01)
*B60K 37/06* (2006.01)
*G05G 5/06* (2006.01)

(52) U.S. Cl.
CPC *G05G 1/10* (2013.01); *B60K 37/06* (2013.01); *G05G 5/06* (2013.01); *B60K 2350/102* (2013.01)
USPC .................................. 74/533; 74/548

(58) Field of Classification Search
CPC ............ G05G 1/08; G05G 1/12; G05G 1/10; G05G 1/082; G05G 1/087; G05G 1/02; G05G 1/04; G05G 1/06; G05G 5/00; G05G 5/005; G05G 5/04; G05G 5/05
USPC ............................... 74/504, 548, 553; 16/441
See application file for complete search history.

(56) References Cited

U.S. PATENT DOCUMENTS

| 2,214,730 | A | 9/1940 | Jeffers | 74/527 |
| 2,501,008 | A | 3/1950 | Schramm | 74/548 |
| 2,797,591 | A | 7/1957 | Marrapese | 74/528 |
| 2,797,592 | A | 7/1957 | Marrapese | 74/548 |
| 3,313,057 | A | 4/1967 | Leddy | 40/331 |
| 3,410,247 | A | 11/1968 | Dronberger | 116/133 |
| 3,473,408 | A | 10/1969 | Bettinger | 74/553 |
| 3,589,399 | A | 6/1971 | Vignes | 137/625.3 |

(Continued)

FOREIGN PATENT DOCUMENTS

CA          2201033        9/1998
CN  ZL 200820085349.X    2/2009

(Continued)

OTHER PUBLICATIONS

JP 2004-169514 A English translation from the JPO AIPN translation service. Retrived Mar. 21, 2013.*

(Continued)

*Primary Examiner* — Marcus Charles
*Assistant Examiner* — Yamilka Pinero Medina
(74) *Attorney, Agent, or Firm* — Pillsbury Winthrop Shaw Pittman LLP

(57) ABSTRACT

A control knob has a body and a lock mechanism. The lock mechanism acts as a safety mechanism or safeguard by biasing the knob in a locked position, thereby preventing the knob from engaging a control stem or other structure on, for example, an appliance. This prevents the knob from inadvertent rotation which may power-on an appliance, or cause a change in a current setting of an appliance which, in certain instances, may have dangerous repercussions.

15 Claims, 26 Drawing Sheets

(56) References Cited

U.S. PATENT DOCUMENTS

| | | | | |
|---|---|---|---|---|
| 3,769,933 | A | 11/1973 | Fox | 116/124.2 A |
| 3,965,529 | A | 6/1976 | Hadzimahalis | 16/121 |
| 4,012,806 | A | 3/1977 | Howie, Jr. | 16/121 |
| 4,037,490 | A | 7/1977 | Wilson | 74/553 |
| 4,135,471 | A | 1/1979 | Wooldridge et al. | 116/366 |
| 4,230,064 | A | 10/1980 | Mack | 116/245 |
| 4,253,690 | A | 3/1981 | Hollander | 292/354 |
| 4,300,525 | A | 11/1981 | Delgado et al. | 126/42 |
| 4,575,141 | A | 3/1986 | Burns | 292/336.3 |
| 4,779,305 | A * | 10/1988 | Gorsek | 16/441 |
| 5,363,720 | A | 11/1994 | Sanchez | 74/553 |
| 5,741,003 | A | 4/1998 | Segien, Jr. | 251/95 |
| 5,771,878 | A | 6/1998 | Lewis et al. | 126/42 |
| 6,192,774 | B1 | 2/2001 | Bauer et al. | 74/553 |
| 6,375,150 | B1 | 4/2002 | Aguirre-Esponda et al. | 251/96 |
| 6,394,081 | B1 | 5/2002 | Aguirre-Esponda et al. | 126/42 |
| 6,463,630 | B1 | 10/2002 | Howie, Jr. | 16/441 |
| 6,827,306 | B1 | 12/2004 | Datcuk, Jr. | 242/303 |
| 6,842,946 | B2 | 1/2005 | Hayden | 16/414 |
| 7,111,365 | B1 | 9/2006 | Howie, Jr. | 16/441 |
| 7,171,727 | B2 | 2/2007 | Wylie et al. | 16/441 |
| 7,399,939 | B2 | 7/2008 | Hettinger et al. | 200/336 |
| 7,963,003 | B1 | 6/2011 | Keene | 16/441 |
| 8,056,441 | B2 | 11/2011 | Lu | 74/553 |
| 2006/0278035 | A1 * | 12/2006 | Casas | 74/553 |
| 2008/0197642 | A1 | 8/2008 | Talpe | 292/336.3 |

FOREIGN PATENT DOCUMENTS

| | | | |
|---|---|---|---|
| DE | 28 03 555 | | 8/1978 |
| GB | 2 253 898 | | 9/1992 |
| GB | 2 344 881 | | 6/2000 |
| JP | 8-170827 | | 7/1996 |
| JP | 2004169514 A | * | 6/2004 |
| JP | 2006152773 A | * | 6/2006 |
| JP | 2009150162 A | * | 7/2009 |
| SE | 9802019 | | 12/1999 |

OTHER PUBLICATIONS

Machine translation of JP 2009-150162.*

* cited by examiner

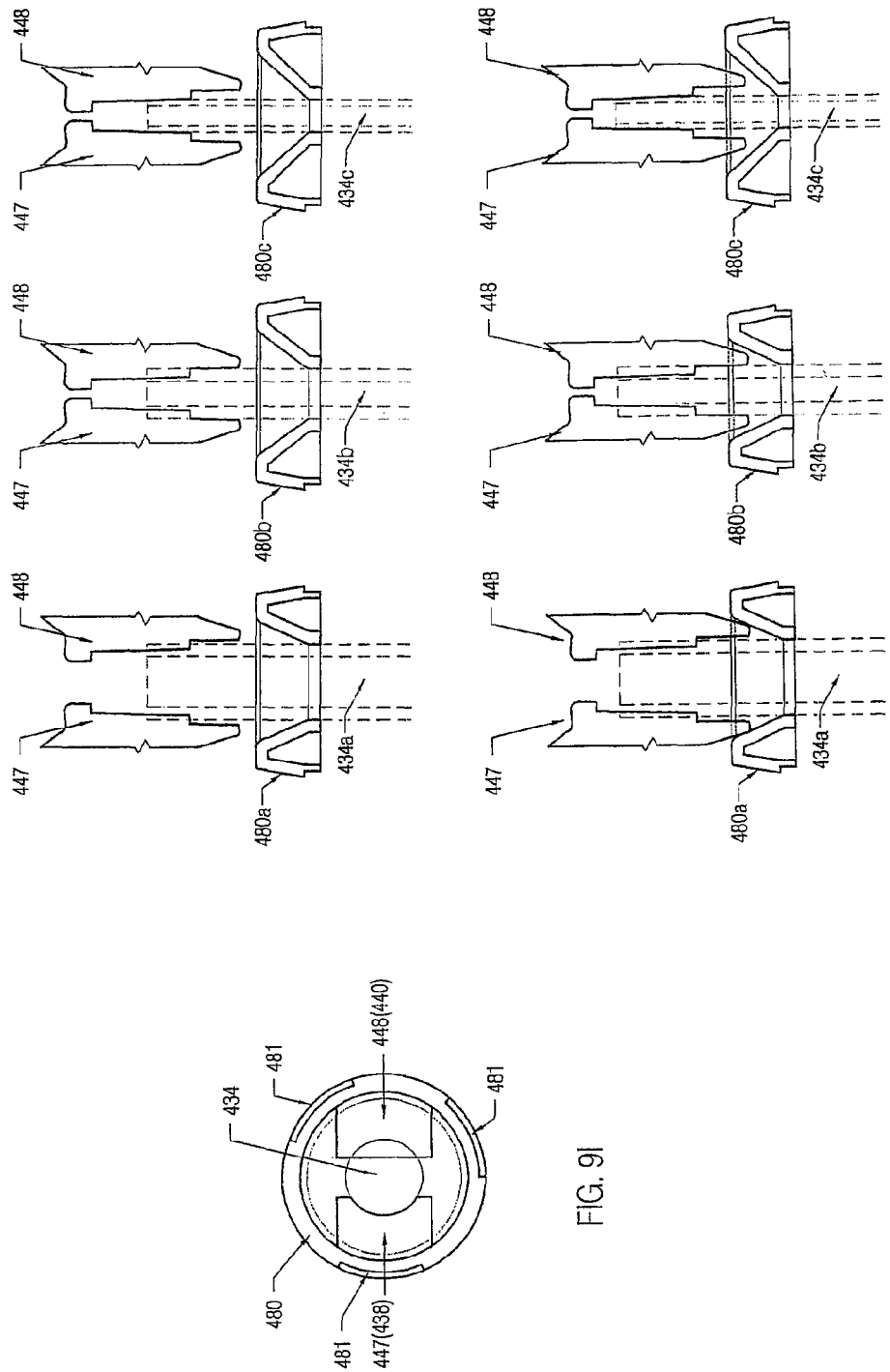

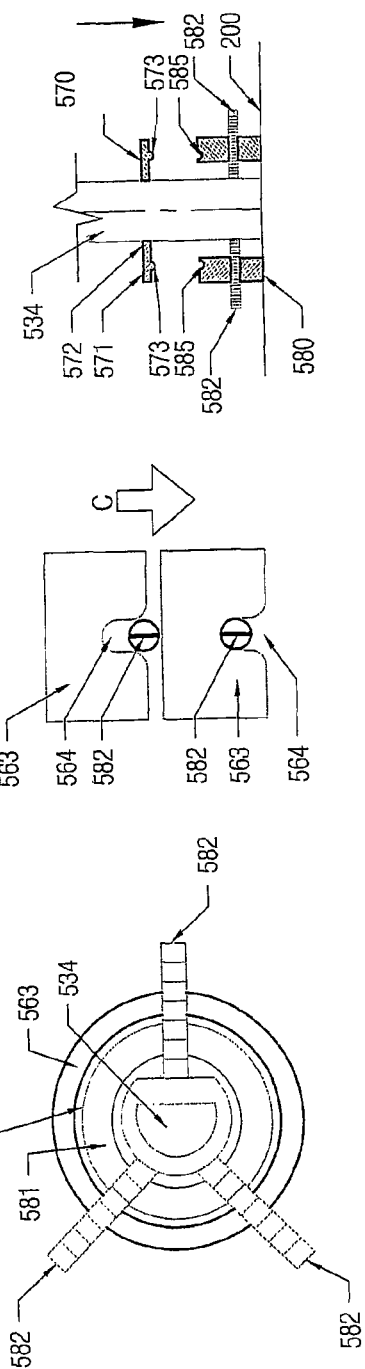

KNOB WITH LOCK MECHANISM

CROSS-REFERENCE TO RELATED APPLICATIONS

This application claims priority to U.S. Provisional Patent Application Ser. No. 61/245,916, filed Sep. 25, 2009, which is hereby incorporated by reference herein in its entirety.

FIELD OF THE INVENTION

The invention relates generally to control knobs, and more particularly to control knobs with lock mechanisms for preventing inadvertent (e.g., accidental) changes to various settings or operating parameters of appliances.

BACKGROUND OF THE INVENTION

Rotating knobs are often found on a number of different appliances including, for example, stoves and washing machines, and are typically used for controlling various settings or operating parameters of appliances (e.g., temperature, cycles, etc.).

Inadvertent (e.g., accidental) rotation of a knob may power-on an appliance (or a portion thereof), or cause a change in a current setting of an appliance which, in certain instances, may have dangerous repercussions. For example, safety concerns arise when small children, driven by curiosity, try and manipulate knobs. Particularly, a child may accidentally turn on a stove burner and/or increase the amount of heat of a stove burner simply by turning a knob. Some conventional stove knobs, for instance, may require slight depression of the knob and control stem in order to allow the knob and control stem to rotate from an default or neutral position to an active position. In view of these concerns, some knobs are designed with safety and/or lock mechanisms that seek to prevent rotation of a knob. Known safety and/or lock mechanisms for control knobs, however, can be improved.

SUMMARY OF INVENTION

The invention described herein is directed to control knobs with lock mechanisms for preventing inadvertent (e.g., accidental) changes to various settings or operating parameters of appliances.

According to an aspect of the invention, a control knob includes a body and a lock mechanism. The lock mechanism (and its constituent components) acts as a safety mechanism or safeguard by biasing the knob in a locked position, thereby preventing the knob from engaging a control stem or other structure on, for example, an appliance. In one implementation, the lock mechanism may include two grasp segments (or push buttons) to be moved in a lateral or pivotal direction (e.g., substantially toward one another) to enable the knob to then be pushed forward (or inward) toward a surface of the appliance to engage (and enable rotation of) the control stem.

The various embodiments of the control knob set forth herein describe the control knob as a mechanism to control various settings of a burner or oven of an appliance. However, the various embodiments of the control knob as described herein may be used with any number of other appliances or devices including, but not limited to, dishwashers, washing machines and/or dryers, air conditioning devices, thermostats, heaters, or other appliances or devices.

Various objects, features, and advantages of the invention will be apparent through the detailed description of the preferred embodiments and the drawings attached hereto. It is also to be understood that both the foregoing general description and the following detailed description are exemplary and not restrictive of the scope of the invention.

BRIEF DESCRIPTION OF THE DRAWINGS

FIG. 9I is an exemplary illustration depicting engagement of first and second grasp segments of the control knob with a control stem, according to an aspect of the invention.

FIG. 9J is an exemplary illustration depicting use of the control knob with control stems of varying size, according to an aspect of the invention.

FIGS. 10E-10H are exemplary illustrations of cross-sectional views of the control knob viewed along axis 10E-10F in FIG. 10B, for various states of operation of the control knob.

FIG. 10I is an exemplary illustration of one implementation of a stem coupling, according to an aspect of the invention.

FIG. 10J is an exemplary illustration of a sleeve for engaging a control stem coupling element, according to an aspect of the invention.

FIG. 10K is an exemplary illustration of an alignment jig that may be used to "center" and align a control stem coupling element relative to a control stem, according to an aspect of the invention.

DETAILED DESCRIPTION OF THE INVENTION

Figure 1:
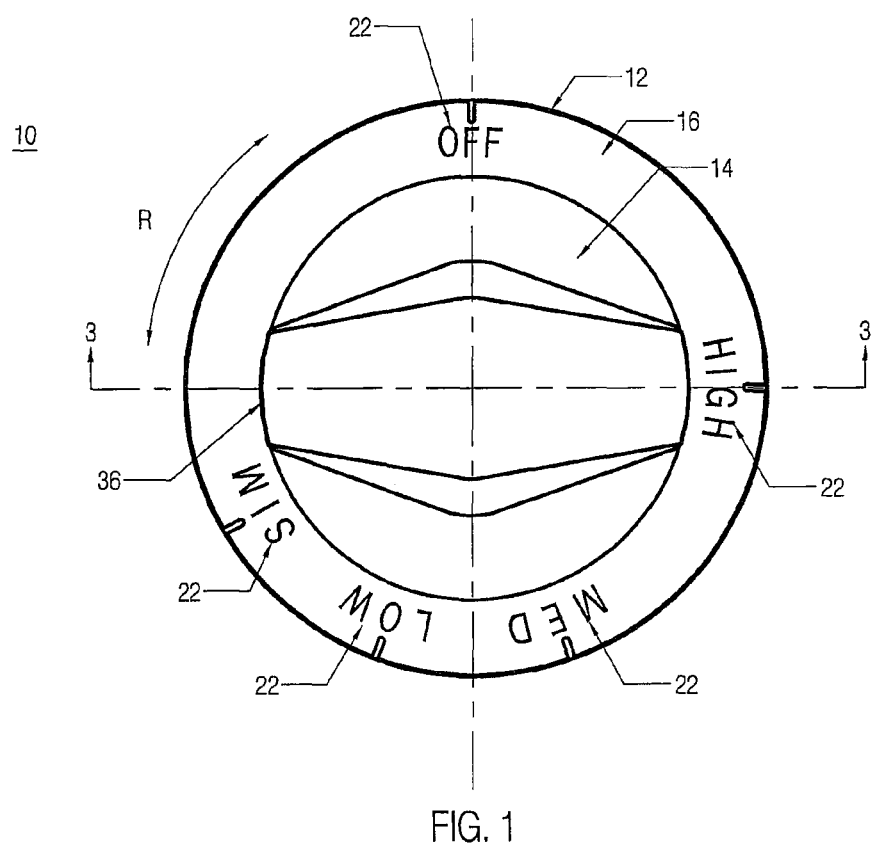
FIG. 1 is an exemplary illustration of a top view of a control knob, according to an aspect of the invention.

FIG. 1 is an exemplary illustration of a top view of a control knob (or knob) 10, according to an aspect of the invention. In one implementation, control knob 10 comprises a body 12 and a lock mechanism 36. Body 12 may comprise a grasp portion 14 and a mount portion 16. As will be described in greater detail herein, lock mechanism 36 (and its constituent components) acts as a safeguard by biasing knob 10 in a (default or natural) locked position, thereby preventing knob 10 from engaging a control stem or other structure (e.g., on an appliance). This prevents knob 10 from rotating in either of the directions depicted by arrow "R."

Figure 2:
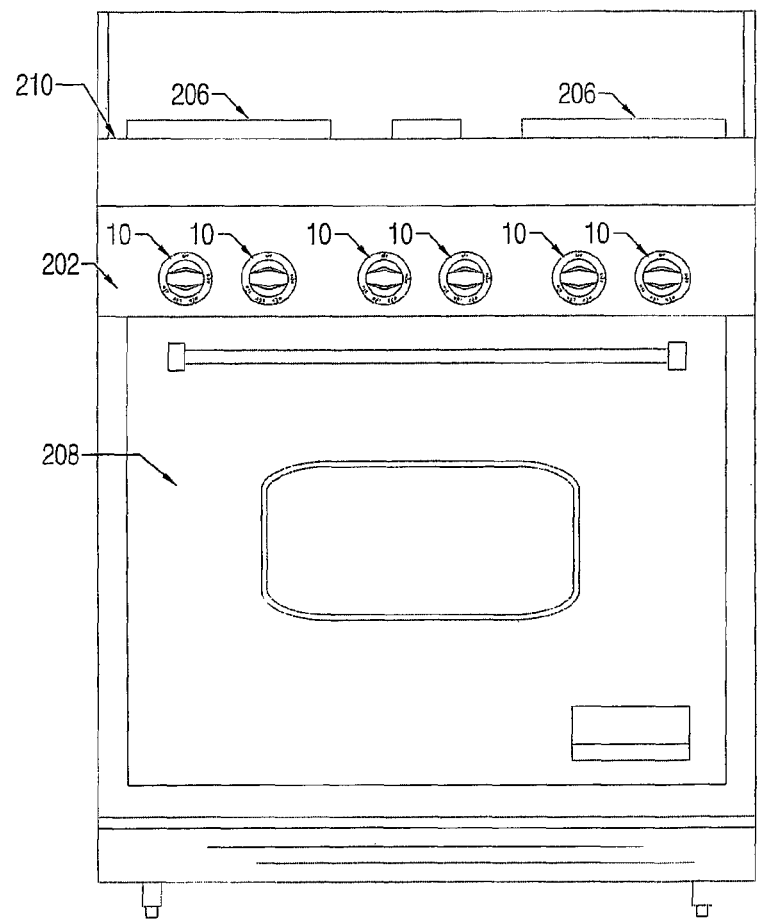
FIG. 2 is an exemplary illustration of appliance employing a number of the control knobs of FIG. 1, according to an aspect of the invention.

In one exemplary and non-limiting implementation, as shown in FIG. 2, one or more knobs 10 may be utilized to control various settings of a cooking appliance 200, such as a stove (or range). Appliance 200 may include an oven 208 as well as a stove top 210 having a number of burners 206. Appliance 200 may be, for example, an electric or gas appliance as known and understood by those having skill in the art. The control knobs 10 may be operatively coupled to a front-facing surface 202, an upwardly facing surface, or other surface of appliance 200, depending on the style of appliance 200. For exemplary purposes only, a non-limiting implementation described herein depicts knobs 10 on a front-facing surface 202 of appliance 200. In some implementations, an escutcheon plate 204 (see FIGS. 3A-3B) and washers may be provided between a back side of the knobs 10 and a surface of appliance 200, as known and understood by those having skill in the art.

According to an aspect of the invention, each control knob 10 may, for example, control a valve (or other mechanism) that controls an amount of gas or electricity supplied to a particular burner 206, or to oven 208. As such, in one implementation, as illustrated in FIG. 1, one or more markings 22 may be provided on mount portion 16 of knob 10. Markings 22 may correspond to various settings for appliance 200 that may be controlled by knob 10. Non-limiting examples of such settings may include, for instance, incremental or interval settings for applying heat to a particular burner 206, such as an "OFF" setting, a simmer setting "SIM," a "LOW" setting, a "MEDIUM" setting, a "HIGH" setting, or other settings. Alternatively, knob 10 may be provided without markings 22 in those instances when markings may be provided on the escutcheon plate 204 or other surface of appliance 200.

Although the foregoing and following description reference the use of various embodiments of a control knob as a mechanism to control various settings of a burner or oven of an appliance, it should be understood that the various embodiments of the control knob as described herein may be used with any number of other appliances or devices including, but not limited to, dishwashers, washing machines and/or dryers, air conditioning devices, thermostats, heaters, or other appliances or devices. Accordingly, the description and accompanying drawing figures are exemplary in nature, and should not be viewed as limiting.

Figure 3A:
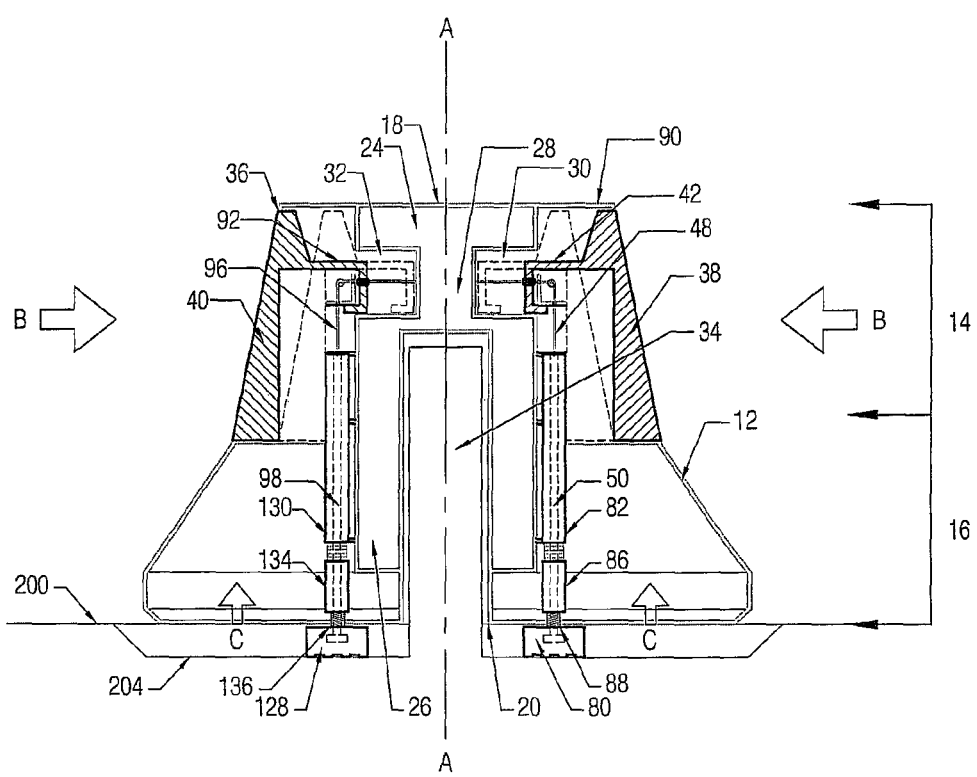
FIG. 3A is an exemplary illustration of a sectional view of the control knob in a (default or natural) locked position, according to a first embodiment of the invention.

FIG. 3A is an exemplary illustration of a sectional view of a first embodiment of control knob 10 in a (default or natural) locked position. As shown, mount portion 16 of body 12 may comprise a diagonally flared wall that extends in an outward direction from grasp portion 14.

In one implementation, a center portion 18 of knob 10 may comprise an integrally-formed portion of body 12, or may comprise a portion separate from body 12. Center portion 18 may comprise a first (upper) part 24, a second (lower) part 26, and an attachment slot 20. Attachment slot 20 enables knob 10 to interface with (or connect to) a control stem 34 of a valve (or other structure or portion) of an appliance (e.g., appliance 200 of FIG. 2). For example, attachment slot 20 may comprise an opening, bore, or passage that extends longitudinally into center portion 18. Control stem 34 is designed to rotate about an axis A-A.

The design and/or shape (e.g., cross-section) of attachment slot 20 may be configured to correspond to a shape of a control stem (e.g., control stem 34) (or other structure or portion) that knob 10 is to engage. For example, in some implementations, in order to change a setting of a valve (e.g., to turn a valve to an open or "ON" position), control knob 10 may need to engage a control stem end 46 of control stem 34. Thus, attachment slot 20 may have a complimentary design or shape that allows for a connection to control stem 34 (or other structure or portion). As will be described in greater detail below, in one implementation, control knob 10 may include an adjustable clamp mechanism that enables control knob 10 to universally fit control stems (or other structures or portions) of any number of appliances.

Control stems are known in the art, and may have different cross-sections. Control stem 34 may, for instance, have a circular cross-section. As such, attachment slot 20 may have a circular or curved configuration defined by an opening, bore, or passage having a circular cross-section.

One common type of control stem has a "D"-shaped cross-section, and is accordingly commonly referred to as a "D" stem. In one exemplary (and non-limiting) implementation, therefore, control stem 34 may have a generally curved surface and a flat, linear surface extending along it shaft. As such, if configured to engage a "D"-stem, attachment slot 20 of knob 10 may be designed to include a complimentary generally curved surface and a flat, linear surface which are aligned with the respective surfaces of control stem 34.

Referring back to FIG. 3A, first (upper) part 24 of center portion 18 comprises an engagement portion 28. In some cases, engagement portion 28 may be defined by a cut-out section that is formed about the periphery of first part 24 of center portion 18. In FIG. 3A, the cut out section is illustrated as a first cut out section 30 and a second cut out section 32 (because of the sectional view 3-3).

Engagement portion 28 is used for engagement with control stem 34, for example. As shown, when knob 10 is mounted on control stem 34, engagement portion 28 is not in direct contact or engagement with control stem end 46 of control stem 34. Thus, control stem 34 cannot be rotated to open or change a setting of a valve. The disengagement of center portion 18 of knob 10 with control stem 34 is caused by lock mechanism 36 (described in detail below). In order to engage these parts, lock mechanism 36 needs to be moved from its normally biased (or default) locked position to an unlocked position. Knob 10 may then be linearly and rotationally moved along/about axis A-A. In some cases, knob 10 may rotate up to and including 360 degrees around axis A-A in either direction about axis A-A, as indicated by arrow R in FIG. 1. The linear or longitudinal movement of knob 10 along axis A-A may be limited based on an amount of space required to contact and engage control stem 34.

According to an aspect of the invention, as shown in FIG. 3A for example, lock mechanism 36 of control knob 10 is attached to body 12 and comprises a first (right) grasp segment 38 and a second (left) grasp segment 40. First grasp segment 38 and second grasp segment 40 may be disposed at least partially about the periphery of body 12 of knob 10. First grasp segment 38 and second grasp segment 40 may, for example, be provided on either side of center portion 18. First grasp segment 38 and second grasp segment 40 may comprise two separate segments which are disposed at least partially about the periphery of knob 10, or which are disposed to cover both sides of knob 10. Some portion (or all) of the external surfaces of first grasp segment 38 and second grasp segment 40 may be ribbed, knurled, etc. to facilitate grasping and/or manipulation of the grasp segments.

First grasp segment 38 and second grasp segment 40 of lock mechanism 36 are configured for lateral movement between a locked position (e.g., FIG. 3A) and an unlocked position (e.g., FIG. 3B) in a lateral direction (a direction that is perpendicular to axis A-A). In one implementation, first grasp segment 38 and second grasp segment 40 may be pressed or moved in the lateral direction by one or more of a person's fingers and/or thumb. In some implementations, a guide 90 may be provided as part of knob 10 to assist in guiding first grasp segment 38 and second grasp segment 40 toward center portion 18.

Figure 3B:
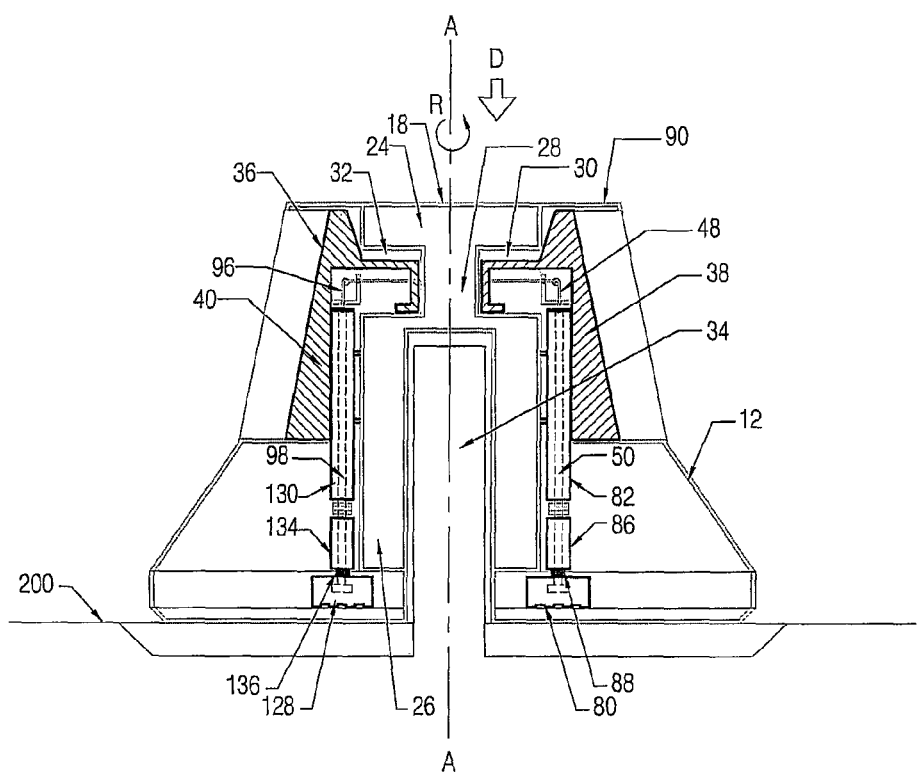
FIG. 3B is an exemplary illustration of a sectional view of the control knob of FIG. 3A in an unlocked position.
Figure 4:
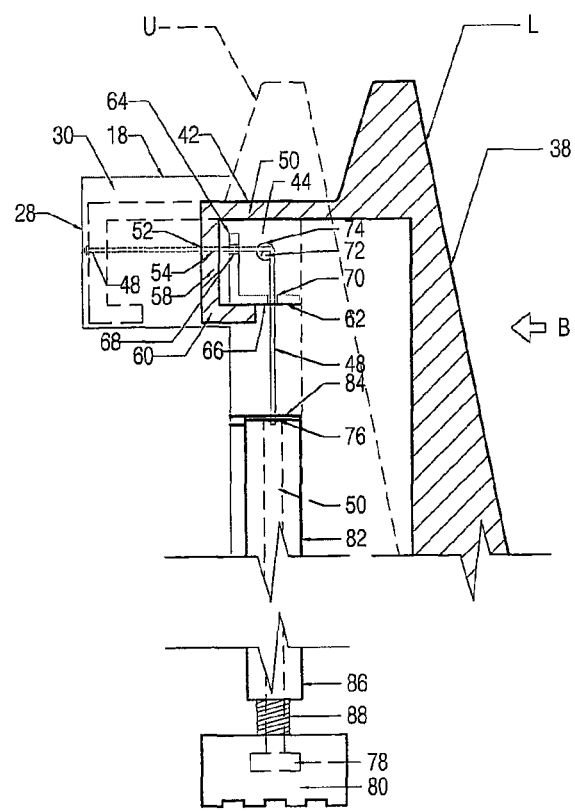
FIG. 4 is an exemplary illustration of a detailed, sectional view of a lock mechanism of the control knob of FIG. 3A.

FIG. 4 is an exemplary illustration of a detailed, sectional view of one side or grasp segment of lock mechanism 36. Specifically, FIG. 4 illustrates first (or right) grasp segment 38 of knob 10. First grasp segment 38 is configured to move between a locked position "L" (e.g., FIG. 3A) and an unlocked position "U" (e.g., FIG. 3B). More specifically, an outer surface of first grasp segment 38 is designed to be grasped and moved by applying pressure to first grasp segment 38 in a lateral direction from a first, extended position (e.g., FIG. 3A) to a second, retracted position (e.g., FIG. 3B). In the illustrated implementation, first grasp segment 38 is formed with an extending wedge-shaped portion, which extends toward the top of knob 10 and guide 90.

First grasp segment 38 also includes a first extension area 42 having a first notch 44 therein for housing additional components of lock mechanism 36. In some implementations, first extension area 42 and first notch 44 may be formed such that they are oppositely and correspondingly shaped to first cut out section 30 of engagement portion 28. This allows first extension area 42 and first notch 44 to be received in first cut out section 30 when moved laterally. As further illustrated in FIG. 4, lock mechanism 36 comprises first tension cable 48, a first stem 50, and first biasing member 88, each of which may be housed in first extension area 42. These components may be used to selectively retain and bias lock mechanism 36. For example, first (right) stem 50 is biased by a first biasing member 88 toward a surface 202 of an appliance 200 (see, e.g., FIG. 3A). First stem 50 may have a first stern end 78 surrounded by a first stop 80. First stop 80 may comprise a pad that is mounted or secured to first stem end 78 in order to protect a surface 202 or escutcheon plate 204 of appliance 200 from damage. In some implementations, first stop 80 may be formed from flexible and/or resilient material, such as molded rubber. First stop 80 may also comprise a ribbed surface or other design to assist in better engagement with surface 202 or escutcheon plate 204 to prevent slipping, for example.

The biasing force of first biasing member 88 forces first stem 50 and thus lock mechanism 36 toward the locked position. First biasing member 88 may comprise an elastic member, such as a compression spring. First stem 50 may be provided with a first stem enclosure 82 to secure first biasing member 88 thereto. First stem enclosure 82 may be fixedly attached to body 12, for instance, by welding, various fasteners, adhesive, or the like, so that first stem 50 can move relative to stem enclosure 82. As such, first biasing member 88 urges pad 80 into frictional engagement with surface 202 or escutcheon plate 204 and creates a tension in cable 48 (e.g., between first stem 50 and first grasp segment 38). A first end of first biasing member 88 contacts a bottom of first stem enclosure 82 and a second end of first biasing member 88 contacts first stop 80. First biasing member 88 may be mounted or secured via friction (e.g., such that it is placed in a fitted configuration with respect to the other elements), glue/adhesive, or by other means. First biasing member 88 may be positioned in relation to first stem 50 such that it is in a natural state of rest in the locked position. This is so that the elasticity of first biasing member 88 exhibits biasing characteristics to return to its natural state when stretched therefrom.

First tension cable 48 is configured to cooperate with first biasing member 88 in order to apply a force to first biasing member 88, thereby causing the biasing action of lock mechanism 36 toward the locked position. In order to mount first cable 48, first stem 50, and first biasing member 88 such that they will be biased toward a locked position, first grasp segment 38 of lock mechanism 36 may further comprise additional parts which help mount and secure first tension cable 48, first stem 50, and first biasing member 88 within first notch 44 of first extension area 42. In some implementations, first extension area 42 may comprise an upper leg 56, a side leg 58, and a lower anchor leg 60. As shown, first tension cable 48 may be mounted at first cable end 52 to leg 58 of first extension area 42, and at a second cable end 76 to a first cable securement area 84 of first stem 50. This enables the tension in first tension cable 48 to be adjusted or determined based on the natural state of first biasing member 88. More specifically, the length of first tension cable 48 may be determined by the position of first biasing member 88, in its natural state, to first stem 50.

Side leg 58 may include an opening 54 that enables first tension cable 48 to be threaded therethrough from its secured first cable end 52. Also, a first angle structure 62 for assisting in directing and keeping first tension cable 48 in tension may be attached to leg 60 or in first extension area 42. First angle structure 62 may be attached in any number of ways. First angle structure 62 generally comprises first wall segment 64 and second wall segment 66, which are perpendicular to each other in this implementation, and may form an "L" shape. First wall segment 64 and second wall segment 66 may include a first hole 68 and a second hole 70, respectively, for threading first tension cable 48 therethrough.

A first guide pin 72 may also be included for securing the mounting of first tension cable 48 in first extension area 42. First guide pin 72 may be secured in a first slot 74 in first extension area 42 of the knob, or mounted in a similar manner. First tension cable 48 may be directed from opening 54 of side leg 58, through first hole 68 in first wall segment 64, around first guide pin 72, and through second hole 70 in second wall segment 66 toward first cable securement area 84 of first stem 50. First tension cable 48 is configured to move about first guide pin 72 when pressure or force is applied to first grasp segment 38.

In some implementations, first stem 50 may comprise a first adjustable extension 86 that allows for adjustment of the length of first stem 50 as well as for adjustment of the tension of first tension cable 48 and first biasing member 88. For example, a bottom end of first stem 50 may comprise a male threaded portion, and first adjustable extension 86 may comprise a corresponding female portion with complimentary threads that may be screwed onto the male threaded portion of the stem 50 (or vice versa). Thus, depending on the length or tension required for lock mechanism 36 to be securely engaged with appliance 200 when biased in a locked position, first adjustable extension 86 allows for adjustment of the length of first stem 50 in a linear direction. This is beneficial, for example, when mounting knob 10 on different types or brands of appliances since dimensions of parts (e.g., distance from end of knob 10 to escutcheon 204) may vary.

Figure 5:
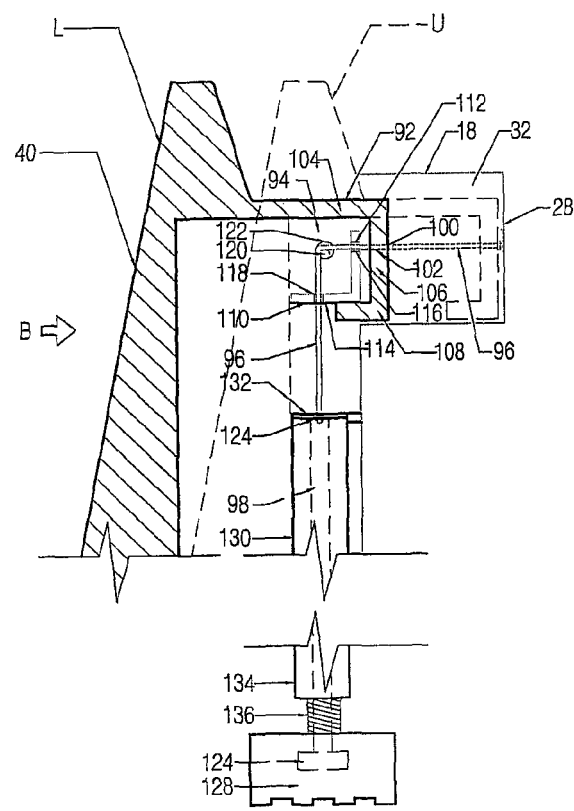
FIG. 5 is an exemplary illustration of a detailed, sectional view of a lock mechanism of the control knob of FIG. 3A.

FIG. 5 is an exemplary illustration of a detailed, sectional view of a second side or grasp segment of lock mechanism 36. Specifically, FIG. 5 illustrates second (or left) grasp segment 40 of knob 10.

Second grasp segment 40 of lock mechanism 36 is configured to move between a locked position "L" and an unlocked position "U." More specifically, an outer surface of second grasp segment 40 is designed to be grasped and moved by applying pressure to second grasp segment 40 in a lateral direction from a first, extended position (e.g., FIG. 3A) to a second, retracted position (e.g., FIG. 3B). In the illustrated implementation, second grasp segment 40 is formed with an extending wedge-shaped portion, which extends toward the top of knob 10 and guide 90.

Second grasp segment 40 also includes an second extension area 92 with a second notch 94 therein for housing additional components of lock mechanism 36. In some implementations, second extension area 92 and second notch 94 may be formed such that they are oppositely and correspondingly shaped to second cut out section 32 of engagement portion 28. This allows second extension area 92 and second notch to 94 be received in the first cut out section when moved laterally.

According to an aspect of the invention, lock mechanism 36 comprises second tension cable 96, a second stem 98 and second biasing member 136, each of which may be housed in second extension area 92. These components may be used to selectively retain and bias lock mechanism 36. For example, second (left) stem 98 is biased by a second biasing member 136 toward a surface 202 of an appliance 200. Second stem 98 may have a second stem end 126 surrounded by a second stop 128. Second stop 128 may comprise a pad that is mounted or secured to second stem end 126 in order to protect a surface 202 or escutcheon plate 204 of appliance 200 from damage. In some implementations, second stop 128 may be formed from flexible and/or resilient material, such as molded rubber. Second stop 128 may also comprise a ribbed surface or other design to assist in better engagement with surface 202 or escutcheon plate 204 to prevent slipping, for example.

The biasing force of second biasing member 136 forces second stem 98 and thus lock mechanism 36 toward the locked position. Second biasing member 136 may comprise an elastic member, such as a compression spring. Second stem 98 may be provided with a second stem enclosure 130 to secure second biasing member 136 thereto. Second stem enclosure 130 may be fixedly attached to body 12, for instance, by welding, various fasteners, adhesive, or the like, so that second stem 98 can move relative to second stem enclosure 130. As such, second biasing member 136 urges pad 128 into frictional engagement with surface 202 or escutcheon plate 204 and creates a tension in cable 96 (e.g., between second stem 98 and second grasp segment 48). A first end of second biasing member 136 contacts a bottom of second stem enclosure 130 and a second end of second biasing member 136 contacts second stop 128. Second biasing member 136 may be mounted or secured via friction (e.g., such that it is placed in a fitted configuration with respect to the other elements), glue/adhesive, or by other means. Second biasing member 136 may be positioned in relation to second stem 98 such that it is at a natural state of rest in the locked position. This is so that the elasticity of second biasing member 136 exhibits biasing characteristics to return to its natural state when stretched therefrom.

Second tension cable 96 is configured to cooperate with second biasing member 136 in order to apply a force to second biasing member 136, thereby causing the biasing action toward the locked position. In order to mount second cable 96, second stem 98, and second biasing member 136 such that they will be biased toward a locked position, second grasp segment 40 of lock mechanism 36 may further comprise additional parts which help mount and secure second tension cable 96, second stem 98, and second biasing member 136 within second notch 94 of second extension area 92. In some implementations, second extension area 92 may comprise an upper leg 104, a side leg 106, and a lower anchor leg 108. As shown, second tension cable 96 may be mounted at second cable end 100 to leg 106 of second extension area 92, and at a second cable end 74 to a second cable securement area 132 of second stem 98. This allows the tension in second tension cable 96 to be adjusted or determined based on the natural state of second biasing member 136. More specifically, the length of second tension cable 96 may be determined by the position of second biasing member 136, in its natural state, in relation to second stem 98.

Side leg 106 may include an opening 102 that enables second tension cable 96 to be threaded therethrough from its secured second cable end 100. Also, a second angle structure 110 for assisting in directing and keeping second tension cable 96 in tension may be attached to leg 108 or in second extension area 92. Second angle structure 110 may be attached in any number of ways. Second angle structure 110 generally comprises first wall segment 112 and second wall segment 114, which are perpendicular to each other in this implementation, and may form an "L" shape. First wall segment 112 and second wall segment 114 may include a first hole 116 and a second hole 118, respectively, for threading second tension cable 96 therethrough.

A second guide pin 120 may also be included for securing the mounting of second tension cable 96 in second extension area 92. Second guide pin 120 may be secured in a second slot 122 in second extension area 92 of the knob, or mounted in a similar manner. Second tension cable 96 may be directed from opening 102 of side leg 106, through first hole 116 in first wall segment 112, around second guide pin 120, and through second hole 118 in second wall segment 114 toward second cable securement area 132 of second stem 98. Second tension cable 96 is configured to move about second guide pin 120 when pressure or force is applied to second grasp segment 40.

In some implementations, second stem 98 may comprise a second adjustable extension 134 that allows for adjustment of the length of second stem 98 as well as for adjustment of the tension of second tension cable 96 and second biasing member 136. For example, a bottom end of second stem 98 may comprise a male threaded portion, and second adjustable extension 134 may comprise a corresponding female portion with complimentary threads that may be screwed onto the male threaded portion of the stem 98 (or vice versa). Thus, depending on the length or tension required for lock mechanism 36 to be securely engaged with appliance 200 when biased in a locked position, second adjustable extension 134 allows for adjustment of the length of second stem 98 in a linear direction. Again, this enables knob 10 to be mounted on different types or brands of appliances since dimensions of parts (e.g., distance from end of knob 10 to escutcheon 204) may vary.

The operation of knob 10 and movement of lock mechanism 36 is now described with reference to FIGS. 3A-3B.

First, as illustrated in FIG. 3A, for example, knob 10 cannot be rotated about axis A-A in either direction because the stems are in an extended and locked position. When lock mechanism 36 is in a locked position, first grasp segment 38 and second grasp segment 40 are biased laterally outwardly via biasing members 88 and 136. More specifically, biasing members 88 and 136 bias first stem 50 and second stem 98 and their respective stops 80 and 128 linearly toward the appliance such that stops 80 and 128 are in engagement with a part (e.g., surface 202 or escutcheon plate 204) of appliance 200. This engagement thereby prevents control knob 10 from being pushed either in a linear or longitudinal direction along axis A-A or turned or rotated about axis A-A because knob 10 is not in engagement with control stem 34 of the valve.

In this implementation, both first grasp segment 38 and second grasp segment 40 must be pressed laterally inwardly toward center portion 18 in order to turn knob 10. Thus, as first grasp segment 38 and second grasp segment 40 are depressed inwardly or laterally in a lateral direction (e.g., in a direction perpendicular to axis A-A) toward center portion 18 of knob 10, as indicated by the "B" arrows, the tension in first tension cable 48 and second tension cable 96 causes lock mechanism 36 to release to an unlocked position. That is, movement of the first grasp segment 38 and second grasp segment 40 correspondingly moves first extension area 42 and second extension area 92 toward engagement portion 28. Concurrently, first tension cable 48 and second tension cable 96 move laterally with first grasp segment 38 and second grasp segment 40, pulling their lengths along first guide pin 72 and second guide pin 120 toward center portion 18. Meanwhile, because of the tension in the cables 48 and 96, first stem 50 (and its first stop 80) and second stem 98 (and its second stop 128) move in a linear or longitudinal direction parallel to axis A-A (e.g., in a direction perpendicular to the lateral movement of the first and second grasp segments 38 and 40).

Lateral activation of first grasp segment 38 and second grasp segment 40 of lock mechanism 36 thereby unlocks control knob 10 and allows for body 12 of control knob 10 to move as indicated by arrows "D" and "R" in FIG. 3B. Once stems 40 are up or away from surface 202, as shown in FIG. 3B, knob 10 may be pushed or linearly moved along axis A-A toward appliance 200 (e.g., see arrow "D") and into engagement with control stem 34. That is, at least engagement portion 28 of knob 10 is engaged with a portion (e.g., control stem end 46) of control stem 34. Knob 10 may also be turned or rotated about rotation axis A-A in either direction (e.g., see arrow "R"), which in turn rotates control stem 34.

The linear movement of first stem 50 thereby pulls first stem end 78 and its first stop 80 in a linear direction away from a locked position and contact with surface 202 of appliance 200, as indicated by the "C" arrow. Similarly, the linear movement of second stem 98 thereby pulls second stem end 126 and its second stop 128 in a linear direction away from a locked position and contact with surface 202 of appliance 200, as also indicated by the "C" arrow. Because the stops 80 and 128 and stem enclosures 82 and 130 are positioned such that biasing members 88 and 136 are in a natural state, the linear movement of stems 50 and 98 and ends 78 and 126 imparts a compression force to first biasing member 88 and second biasing member 136 as they move.

Although not shown, the biasing aspect of lock mechanism 36 is activated once one or both of first grasp segment 38 and second grasp segment 40 are released. Releasing first grasp segment 38 and second grasp segment 40 thereby causes the compression force imparted upon biasing members 88 and 136 in their compressed state to move to their natural state, thereby moving stems 50 and 98 linearly along axis A-A toward appliance 200, such that lock mechanism 36 returns to its locked position as shown in FIG. 3A.

FIGS. 6A-6B, 7, and 8 depict an alternate implementation of control knob 10, which may include an adjustable clamp mechanism 308. Adjustable clamp mechanism 308 enables control knob 10 to universally fit gas and electric control stems (or other structures, components, or portions) of any number of sizes. As illustrated, adjustable clamp mechanism 308 may be adjusted to fit control stem 34.

For ease of explanation, the description below regarding FIGS. 6A-6B, 7, and 8 focuses primarily on the features of adjustable clamp mechanism 308. However, it should be understood that control knob 10 of FIGS. 6A-6B, 7, and 8 may include components similar to those represented in the implementation of FIGS. 1-5, and as described in detail above. Accordingly, FIGS. 6A-6B, 7, and 8 include many of the same reference characters that correspond to the components described above.

Figure 6A:
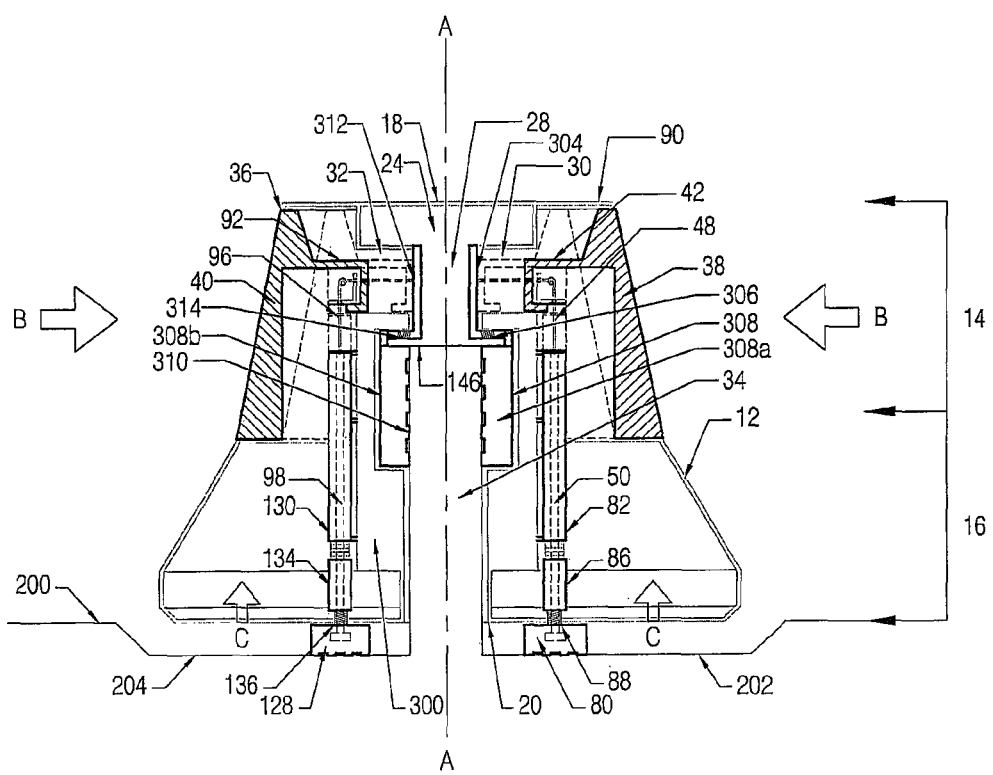
FIG. 6A is an exemplary illustration of a sectional view of the control knob of an alternate implementation of a first embodiment of the invention in a (default or natural) locked position.

Referring to FIG. 6A, in this implementation, second (lower) part 26 (FIG. 3B) is formed as an alternate second (lower) part 300 comprising attachment slot 20 and adjustable clamp mechanism 308. As noted above, attachment slot 20 enables knob 10 to interface with (or connect to) a control stem 34 of a valve (or other structure or portion) of an appliance (e.g., appliance 200 of FIG. 2). Alternate second (lower) part 300 is shaped such that it includes sections to accommodate a first (right) side 308a of adjustable clamp mechanism 308 and a second (left) side 308b of adjustable clamp mechanism 308, as well as its corresponding parts. For example, alternate second (lower) part 300 may include one or more cut-out sections for mounting adjustable clamp mechanism 308 therein. Part of such one or more sections are shown and described in further detail below with regard to FIGS. 7 and 8.

First side 308a and second side 308b of adjustable clamp mechanism 308 are disposed on either side and about the periphery of stem 34. First side 308a and second side 308b are configured to be adjusted (e.g., tightened and loosened) to engage control stem 34. First side 308a and second side 308b may comprise any number of materials and sizes. For example, first side 308a and second side 308b of adjustable clamp mechanism 308 may comprise a molded rubber portion with ribbed surfaces 310 thereon for engagement with control stem 34. The illustrated configuration, however, is not meant to be limiting.

To adjust (e.g., tighten and loosen) adjustable clamp mechanism 308 with respect to control stem 34, a first (right) leg 304 and a second (left) leg 312 may be used with adjustable clamp mechanism 308. First leg 304 and second leg 312 may be disposed about the periphery of engagement portion 28 when control knob 10 is attached to control stem 34, for example. In the illustrated implementation, first leg 304 and second leg 312 may comprise an "L" shape. As shown in greater detail in FIG. 7, first leg 304 may include a first extension portion 316 and a first lateral portion 318. First lateral portion 318 may be secured within a first side portion 320 of alternate second (lower) part 300, for example. As shown, a compression spring 306 or other biasing member may be wrapped around a first lateral portion 318. Compression spring 306 may provide a biasing force which helps guide first side 308a of adjustable clamp mechanism 308 into engagement with control stem 34, for example.

Figure 8:
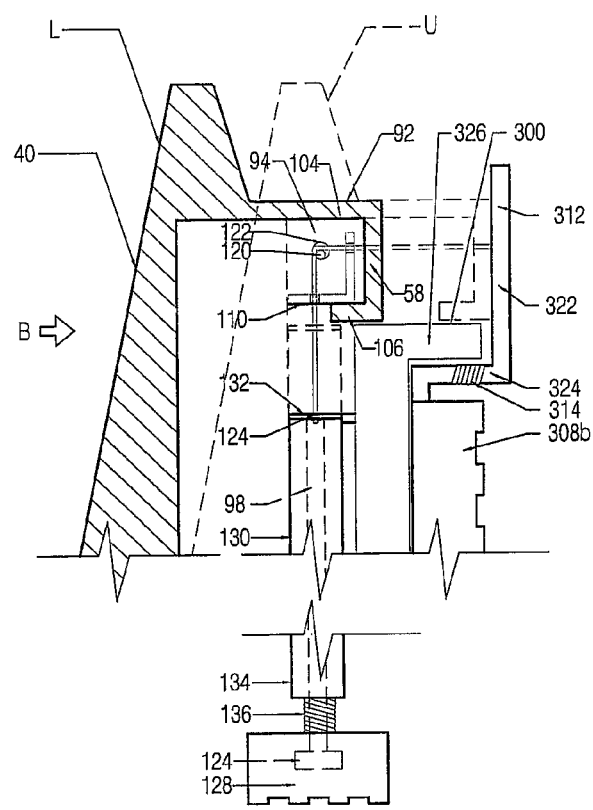
FIG. 8 is an exemplary illustration of a detailed, sectional view of a lock mechanism of the control knob of FIGS. 6A-6B.

Similarly, as shown in greater detail in FIG. 8, second leg 312 may include a second extension portion 322 and a second lateral portion 324. Second lateral portion 324 may, for example, be secured within a second side portion 326 of alternate second (lower) part 300. A compression spring 314 or other biasing member may be wrapped around a second lateral portion 324. Compression spring 314 may provide a biasing force which helps guide second side 308b of adjustable clamp mechanism 308 into engagement with control stem 34.

Figure 6B:
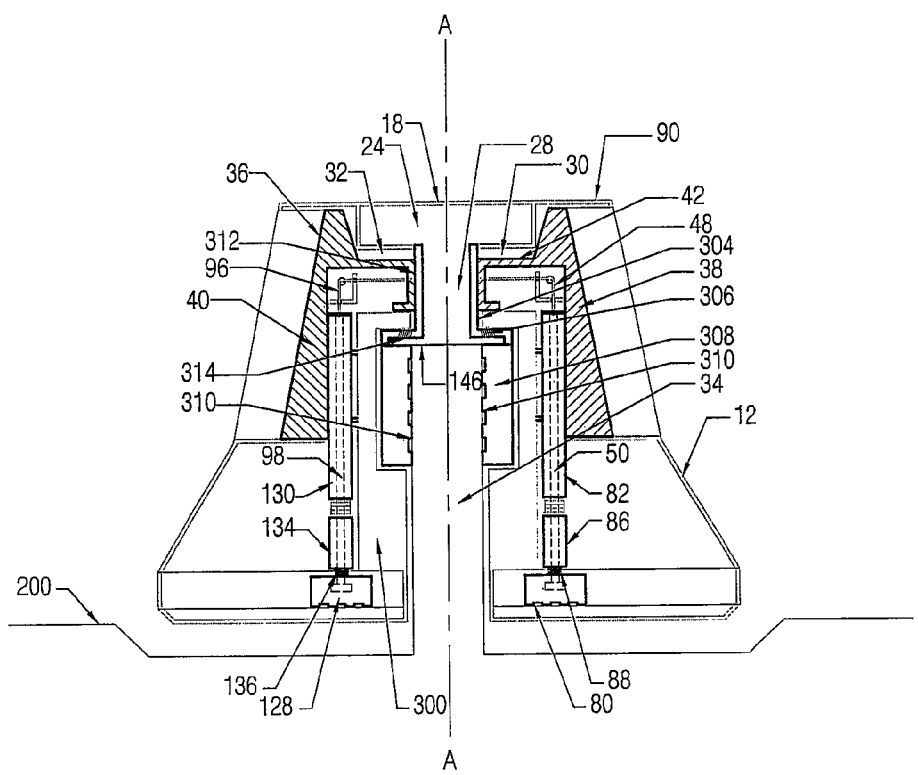
FIG. 6B is an exemplary illustration of a sectional view of the control knob of FIG. 6A in an unlocked position.
Figure 7:
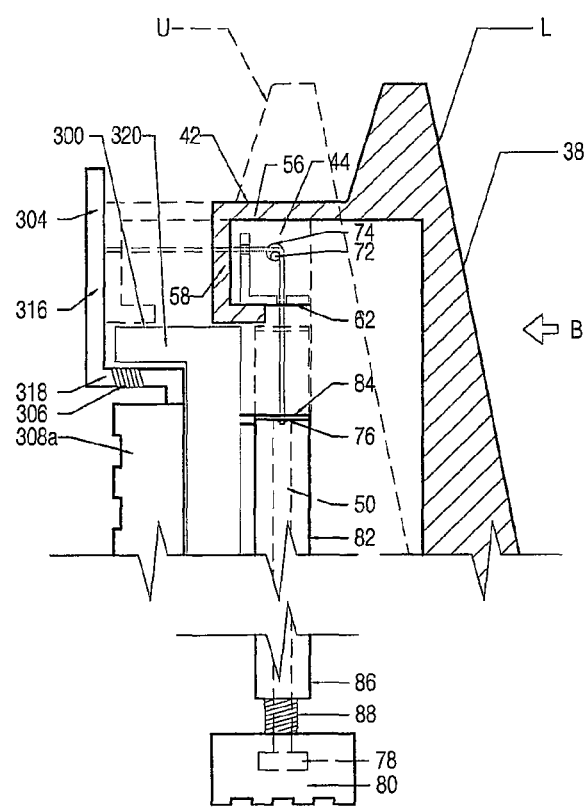
FIG. 7 is an exemplary illustration of a detailed, sectional view of a lock mechanism of the control knob of FIGS. 6A-6B.

Control knob 10, as shown in FIGS. 6A-6B, is operated in a similar manner as that described in detail above with respect to FIGS. 3A-3B. In an implementation, first side 308a and second side 308b may be pressed or moved in the lateral direction by one or more of a person's fingers and/or thumb when first grasp segment 38 and second grasp segment 40 are moved laterally (e.g., between a locked position and an unlocked position). For example, although first side 308a and second side 308b of adjustable clamp mechanism 308 are at least partially engaged with control stem 34, the first side 308a and second side 308b of adjustable clamp mechanism 308 may be further tightened around control stem 34 when lock mechanism 36 is moved into the unlocked position, such that control stem 34 may be rotated about axis A-A.

The materials and processes used to manufacture the parts of lock mechanism 36 may vary. For example, tension cables 48 and 96, stems 50 and 98, angle structures 62 and 110, stem enclosures 82 and 130, and/or biasing members 88 and 136 (e.g., compression spring) may be formed from one or more metals (such as stainless steel (SS)), plastics, or other materials and combinations. Such parts may, for example, be molded or welded.

In addition, control knob 10 and each of its components should not be limited by dimension. For example, in some implementations, knob 10 may comprise an overall diameter of approximately 2.5 inches. In some implementations, knob 10 may have an overall height of up to approximately 2 inches. In one implementation, knob 10 comprises a height of 1 and ¾ inches. Also, attachment slot 20 may comprise any radius or size designed to fit on or over a "D" stem or other shaped control stem 34 which may be present on the appliance. For example, attachment slot 20 may be formed such that it is attached to a 0.35 inch diameter "D" stem on an appliance 200.

The materials and manufacturing methods for fabricating knob 10 and its components should likewise not be limiting. In some implementations, knob 10 may be formed from heat-resistant plastics, enamels, or a combination thereof by molding (e.g., injection molding). First grasp segment 38 and second grasp segment 40 may be formed from a material similar to that of body 12 of knob 10, or from different materials. Angle structures 62 and 110 may be ⅛ of an inch in height, for example.

Control knob 10 as shown and described provides lock mechanism 36 which acts as a safety device in that knob 10 and control stem 34 cannot be inadvertently (e.g., accidentally) rotated without actuation of both sides of lock mechanism 36. As illustrated, a two-sided press operation is performed against first and second walls 23 so that knob 10 may be pushed forward while knob 10 is being simultaneously turned. As shown in FIG. 3A, when first grasp segment 38 and second grasp segment 40 are not pressed simultaneously in a lateral direction, both stops 80 and 128 of first and second stems 50 and 98 are engaged with a surface 202 of the appliance. Lock mechanism 36 therefore prevents pushing in a linear direction and prevents rotation of knob 10 unless both first grasp segment 38 and second grasp segment 40 sides are pressed inwardly. If knob 10 cannot be pushed in, it will not engage control stem 34, thereby preventing it from turning. Because lock mechanism 36 includes two grasp segments (first grasp segment 38 and second grasp segment 40) or push buttons that must be laterally moved in order to unlock the linear and rotational aspects of knob 10, knob 10 is not easily moved by small children. Furthermore, knob 10 can be locked in a locked position at any position about rotation axis A-A. This can also be advantageous as it does not allow for the accidental opening of a valve (e.g., so as to leak gas) or the changing of a current setting (e.g., from LOW to HIGH).

Figure 9A:
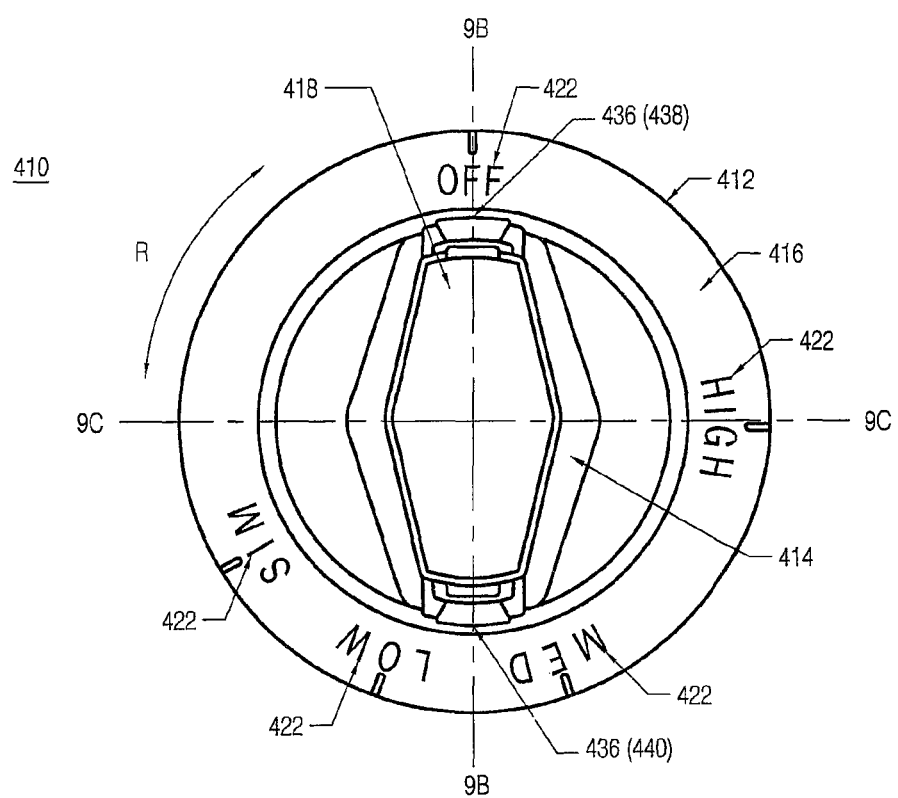
FIG. 9A is an exemplary illustration of a top view of a control knob (or knob), according to a second embodiment of the invention.

FIG. 9A is an exemplary illustration of a top view of a control knob (or knob) 410, according to a second embodiment of the invention. In one implementation, control knob 410 comprises a body 412 and a lock mechanism 436. Body 412 may comprise a grasp portion 414 which is configured to be manually manipulated by a person, and a mount portion 416. Mount portion 416 may be configured for mounting knob 410 to an object such as, for example, a control stem or other structure (e.g., on an appliance), and/or may be attached to body 412 (for rotating with body 412).

As will be described in greater detail herein, lock mechanism 436 (and its constituent components) acts as a safeguard by biasing knob 410 in a (default or natural) locked position, thereby preventing knob 410 from engaging a control stem or other structure 434 (e.g., on an appliance). This prevents knob 410 from rotating in either of the directions depicted by arrow "R." Grasp portion 414 includes center portion 418.

Figure 9B:
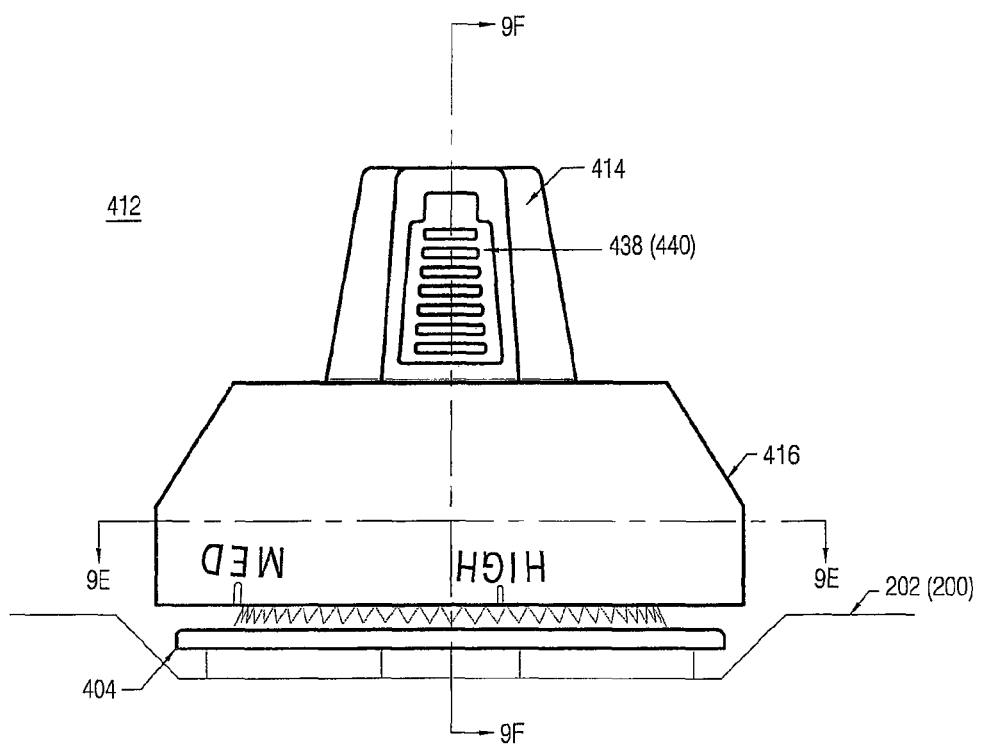
FIGS. 9B-9C are exemplary illustrations of side views of the control knob of FIG. 9A viewed along axis 9B-9B and axis 9C-9C, respectively.
Figure 9C:
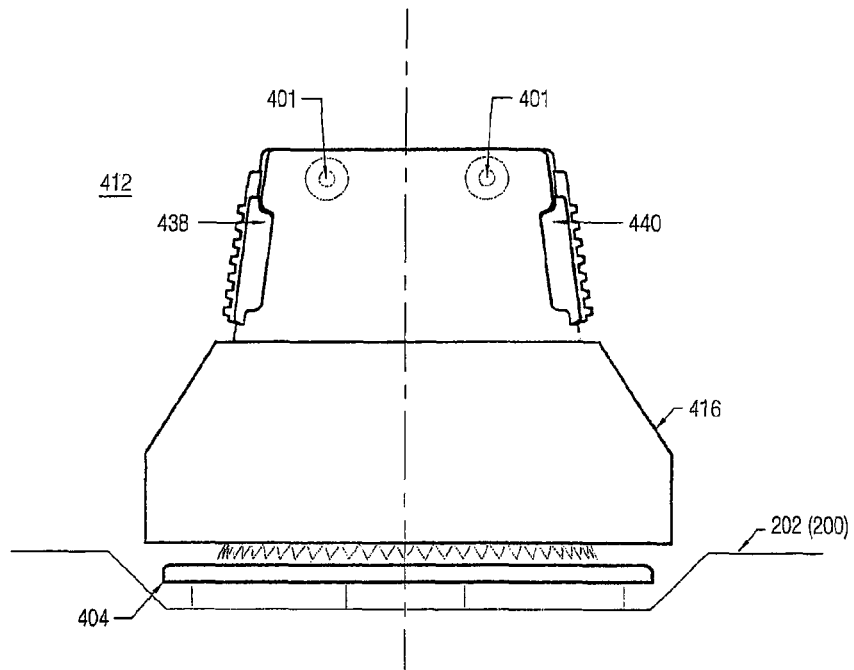

In one implementation, knob body 412 may be fabricated in two or more pieces, for instance, by molding, and later coupled together via connecting portions 401 (FIG. 9C). Connecting portions 401 on corresponding pieces of knob body 412 may "snap" together, for example. Alternatively (or additionally), fasteners or adhesive may be used. Knob 410 may have, in one non-limiting implementation, a 2.4 inch diameter. It should be understood that the materials and manufacturing methods for fabricating knob 410 and its components may vary (and may include those described above with regard to control knob 10), and should therefore not be limiting. In addition, control knob 410 and each of its components should not be limited by dimension (and may include those dimensions described above with regard to control knob 10).

Similar to control knob 10 as described above, one or more markings 422 may be provided on mount portion 416 of knob 410. Markings 422 may correspond to various settings for appliance 200 that may be controlled by knob 410. Non-limiting examples of such settings may include, for instance, incremental or interval settings for applying heat to a particular burner 206, such as an "OFF" setting, a simmer setting "SIM," a "LOW" setting, a "MEDIUM" setting, a "HIGH" setting, or other settings. Alternatively, knob 410 may be provided without markings 422 in those instances when markings may be provided on the escutcheon plate 404 or other surface of appliance 200.

FIGS. 9B-9C are exemplary illustrations of side views of knob 410 viewed along axis 9B-9B and axis 9C-9C (of FIG. 9A), respectively. In some implementations, one or more knobs 410 may be similarly utilized to control various settings of a cooking appliance 200, such as a stove (or range), similar to that shown in FIG. 2. An escutcheon plate 404 and optional washers may be provided between a back side of the knobs 410 and a surface of appliance 200.

Figure 9D:
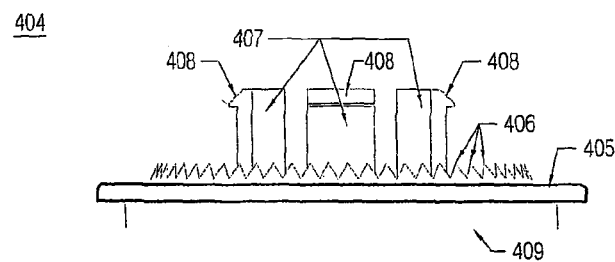
FIG. 9D is an exemplary illustration of a side view of an escutcheon plate that may be used with the control knob, according to an aspect of the invention.

FIG. 9D is an exemplary illustration of a side view of escutcheon plate 404 that may be used with knob 410. Escutcheon plate 404 may include a circular base portion 405 that may be affixed to appliance 200, for instance, with an adhesive and/or fasteners (e.g., screws, rivets, etc.). In one implementation, base portion 405 may be attached to appliance 200 with double-sided heat resistant tape. Base portion 405 may alternatively or additionally include one or more "punch-out" or "break" portions (not shown), which may be removed to permit fasteners to pass therethrough to attach to a portion (e.g., a surface) of appliance 200. In other implementations, base portion 405 may be integrally fabricated with a front-facing surface (or other surfaces) of appliance 200.

A plurality of locking teeth 406 depend from a top of base portion 405. When lock mechanism 436 is engaged, lower depending locking teeth (476, 477) on gear elements (472, 473) (see FIG. 9F) are engaged with the locking teeth 406 so as to maintain knob 410 in a (default or natural) locked position, and to prevent knob 410 from rotating and engaging a control stem or other structure 434 (e.g., on an appliance). As depicted, locking teeth 406 are substantially "V"-shaped. Other locking teeth configurations may also be utilized without departing from the scope of the invention.

Projecting from the top of base portion 405 are a plurality of tabs 407 for attaching mount portion 416 of knob 410 to escutcheon plate 404. Although three of such tabs 407 are shown, any number of tabs 407 may be used. Tabs 407 may be equally spaced (radially) so as to more evenly distribute forces between knob 410 and escutcheon plate 404 when attached. Escutcheon plate 404 has a central opening (or void) 409 for accommodating control stem (or other structure) 434.

In one implementation, a spacer 480 may be located in opening 409 of escutcheon plate 404. Spacer 480 is selected to correspond to the size (e.g., diameter and/or length) of control stem 434. Spacer 480 enables knob 410 to be used with a variety of control stems 434 of varying size (as discussed in greater detail below). Spacer 480 and escutcheon plate 404 may be "keyed" or otherwise interlocked together to prevent relative rotation therebetween. For example, a plurality of notches 411 formed in escutcheon plate 404 engage similar notches/recesses 481 of spacer 480 (see, e.g., FIG. 9I). Alternative rotation-preventing features may also be implemented.

According to an aspect of the invention as shown in FIG. 9A, for example, lock mechanism 436 of control knob 410 is attached to body 412, and comprises a first (right) grasp segment 438 and a second (left) grasp segment 440. First grasp segment 438 and second grasp segment 440 may be disposed at least partially about the periphery of body 412 of knob 410. As shown, first grasp segment 438 and second grasp segment 440 may be provided on either side of center portion 418, spaced 180 degrees apart. Other configurations may be utilized. First grasp segment 438 and second grasp segment 440 may comprise two separate segments which are disposed at least partially about the periphery of knob 410. Some portion (or all) of the external surfaces of first grasp segment 438 and second grasp segment 440 may be ribbed, knurled, etc. to facilitate grasping and/or manipulation of the grasp segments.

In some implementations, lock mechanism 436 may be configured as a "dual locking" release mechanism, in which both first grasp segment 438 and second grasp segment 440 must be depressed together to disengage lock mechanism 436. First grasp segment 438 includes body portion 443, lock engaging portion 445, and stem engaging portion 447. Similarly, second grasp segment 440 includes body portion 444, lock engaging portion 446, and stem engaging portion 448. First grasp segment 438 and second grasp segment 440 of lock mechanism 436 are configured for movement with respect to body 412 of knob 410. In one implementation, first grasp segment 438 and second grasp segment 440 may be pressed or otherwise moved inwardly by one or more of a person's fingers and/or thumb. Such movement may include, for instance, lateral or pivotal movement of grasp segments (438, 440) inward (e.g., toward the center of body 412). Other movement of first and second grasp segments (438, 440) may also be possible to control lock mechanism 436, including rotational movement, longitudinal movement, or a combination of directional movements. In one implementation (as shown), pinions (437, 439) may constrain first grasp segment 438 and second grasp segment 440 to pivotal motion only.

A guide 490 may be provided as part of knob 410 to assist in guiding first grasp segment 438 and second grasp segment 440 toward center portion 418. Guide 490 may include internal walls portions and/or sleeve elements formed in body 412 that constrain movement of grasp segments (438, 440) in substantially one direction only.

First grasp segment 438 and second grasp segment 440 may be depressed inwardly or laterally in a lateral direction toward center portion 418 of knob 410, as indicated by the illustrated "B" arrows. A spring 441 biases first grasp segment 438 and second grasp segment 440 in an outward direction. As shown, a single coil spring 441 is positioned on support 442, a leg of which contacts each grasp segment (438, 440). However, it will be appreciated that each grasp segment (438, 440) could have its own spring, and that other resilient biasing elements may also be used (e.g., leaf spring, compression spring, torsion spring, elastic bands, etc.). When a pressing force is removed, first grasp segment 438 and second grasp segment 440 will return to the locked position via spring 441. To facilitate movement of the first grasp segment 438 and second grasp segment 440, roller bearing units (427, 428) may be provided. Bushings, sheaves, and/or other friction reduction elements (e.g., coatings) may also be used.

A ring element 460 is positioned in the underside of body 412. Ring element 460 couples body 412 of knob 10 to escutcheon plate 404. Ring element 460 may be positioned underneath body 412. In some implementations, ring element 460 may be integrally formed with body 412. Ring element 460 may alternatively be affixed or otherwise fastened to the inner surface of body 412 in other implementations.

According to an aspect of the invention, a spring 465 is positioned between escutcheon plate 404 and ring element 460 to bias knob body 412 away from escutcheon plate 404. Spring 465 may comprise, for instance, a compression spring, although other resilient elements may be used. As illustrated, a lip 466 may be formed in the lower surface of ring element 460 to hold spring 465 in place.

Figure 9E:
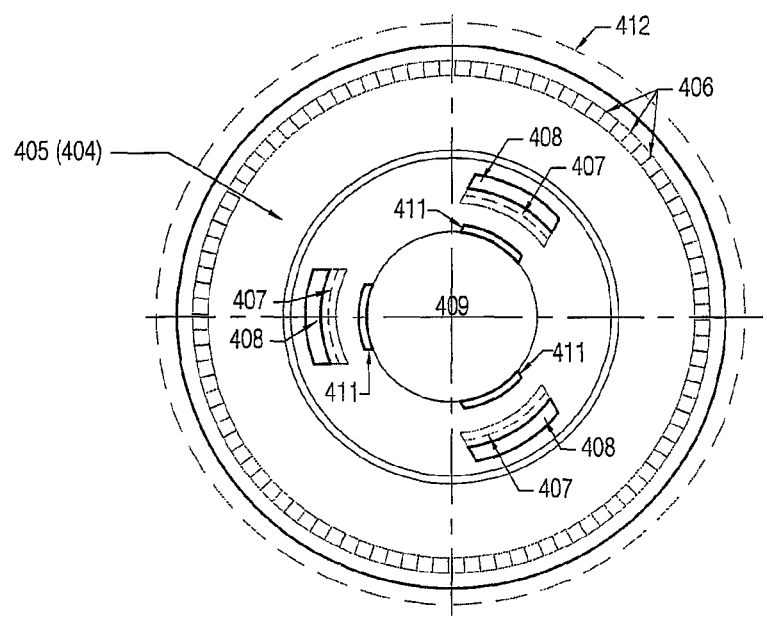
FIG. 9E is an exemplary illustration of a cross-sectional view of the control knob viewed along axis 9E-9E as shown in FIG. 9B.

FIG. 9E is an exemplary illustration of a cross-sectional view of knob 410 viewed along axis 9E-9E (of FIG. 9B). The inner diameter 461 of ring element 460 is sized to engage tabs 407 on escutcheon plate 404. In some implementations, to install knob 410, knob body 412 may be pressed toward escutcheon plate 404, such that the tabs 407 engage inner diameter 461 of the ring element 460. This may, for instance, comprise a "snap" fit. In one implementation (as shown), the distal tip 408 of tabs 407, for example, may include an angled projection which enables the tabs to snap over ring element 460, but not be readily removed therefrom. A large force, for instance, may be necessary for tabs 407 to disengage entirely from inner diameter 461 to remove knob body 412 from escutcheon plate 404. When lock mechanism 436 is in the unlocked position (FIG. 9F), knob 410 can move longitudinally with respect to escutcheon plate 404. In some implementations, knob body 412 may need to be depressed toward escutcheon plate 404 so that tabs 407 are removed from frictional contact with ring element 460 (generated in part by spring 465) to enable knob body 412 to freely rotate. In addition, ring element 460 may include slots or other openings 464 to accommodate lower depending locking teeth (476, 477) of gear elements (470, 471).

Figure 9F:
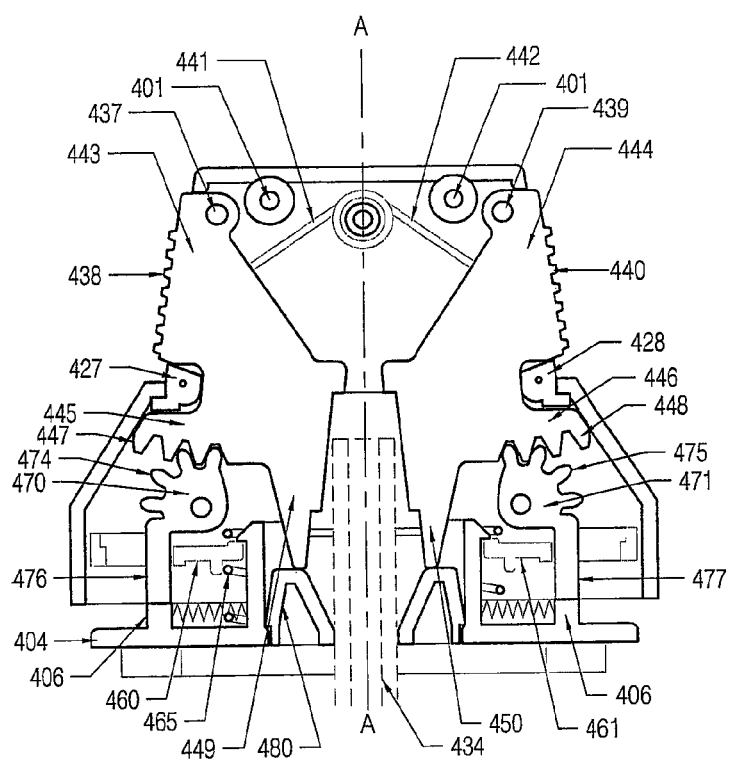
FIGS. 9F-9H are exemplary illustrations of cross-sectional views of the control knob viewed along axis 9F-9F as shown in FIG. 9A, for various states of operation of the control knob.
Figure 9G:
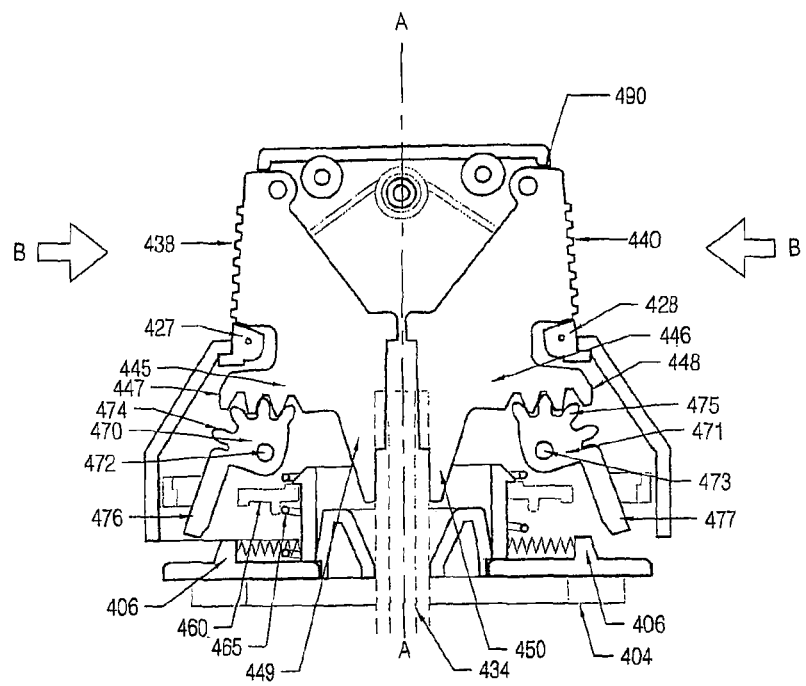
Figure 9H:
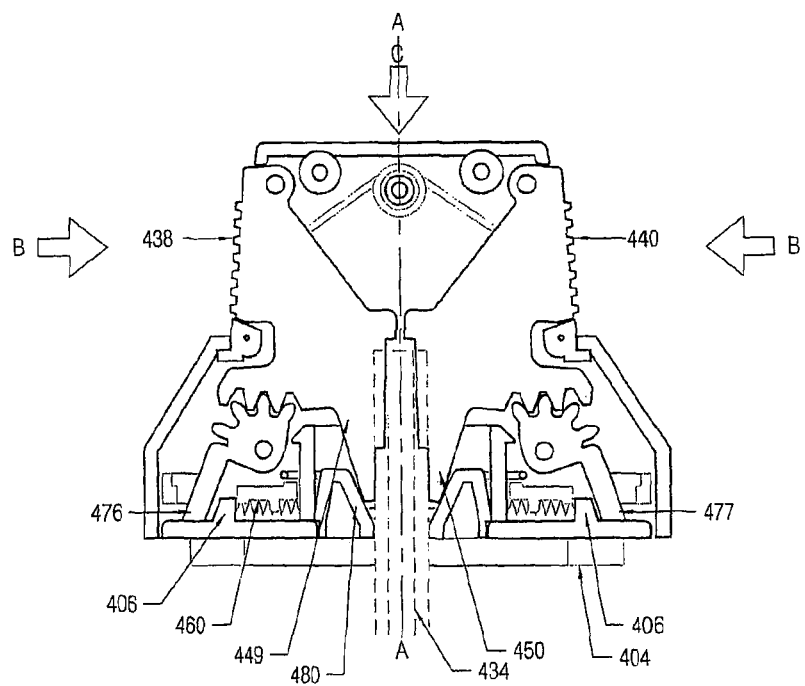

FIGS. 9F-9H are exemplary illustrations of cross-sectional views of knob 410 viewed along axis 9F-9F (of FIG. 9A), for various states of operation of knob 410.

Lock engaging portions (445, 446) of first and second grasp segments (438, 440) include gear teeth (447, 448) which engage gear elements (470, 471), respectively. Gear element 470 pivots about pinion 472 and includes gear teeth 474 and a downwardly extending locking tooth 476. Similarly, gear element 471 pivots about pinion 473 and includes gear teeth 475 and a downwardly extending locking tooth 477. Gear teeth (474, 475) mesh with corresponding gear teeth (447, 448) of lock engaging portions (445, 446) such that movement of gear teeth (447, 448) cause a movement of gear teeth (474, 475) and downwardly extending locking teeth (476, 477). Downwardly extending locking teeth (476, 477) are configured to disengage and engage with locking teeth 406 on escutcheon plate 404 by rotation of gear elements (470, 471), respectively.

According to an aspect of the invention, first grasp segment 438 and second grasp segment 440 of lock mechanism 436 are configured to move between a locked position (e.g., FIG. 9F) and an unlocked position (e.g., FIG. 9G). Once unlocked, first grasp segment 438 and second grasp segment 440 are configured to move in a longitudinal direction (a direction that is substantially parallel to axis A-A) and/or rotate (about axis A-A) to a control stem engaging position (e.g., FIG. 9H). In one implementation, first grasp segment 438 and second grasp segment 440 may be pressed or moved in an inward direction by one or more of a person's fingers and/or thumb. In some implementations, as discussed above, guide 490 may be provided as part of knob 410 to assist in guiding first grasp segment 438 and second grasp segment 40 toward center portion 418.

When an inward force is applied to first and second grasp segments (438, 440), body portions (443, 444) and lock engaging portions (445, 446) also move inwardly. As such, gear teeth (447, 448) of lock engaging portions (445, 446) drive gear teeth (474, 475) of gear elements (470, 471) to rotate about pinions (472, 473) inwardly. This, in turn, causes lower depending locking teeth (476, 477) of gear teeth (470, 471) to rotate outwardly and to disengage with corresponding locking teeth 406 of the escutcheon plate 404. In this unlocked position, body 412 of knob 410 is free to move to engage control stem (or other structure) 434. A person may have to press knob body 412 inward toward appliance 200 for such engagement. Absent a continuous inward force applied to knob body 412 and/or first and second grasp segments (438, 440), lock mechanism 436 will return to a locked position as a result of the biasing members (e.g., springs (441, 465)).

In a locked position, as shown in FIG. 9F, control stem 434 cannot be readily rotated. In some implementations (as shown), the engagement of body 412 of knob 410 with control stem 434 is effectuated by lock mechanism 436. To engage these parts, lock mechanism 436 is moved from its normally biased (or default) locked position to an unlocked position. Knob 410 may then be longitudinally and/or rotationally moved along/about axis A-A. In some instances, knob 410 may rotate up to and including 360 degrees around axis A-A, in either direction, as indicated by arrow "R" in FIG. 9A. The longitudinal movement of knob 410 along axis A-A may be limited based on an amount of space needed to contact and engage control stem 434. In other implementations, body 412 of knob 410 may always be engaged with control stem 434 and, as such, may be able to rotate control stem 434 as soon as lock mechanism 436 is in the unlocked position.

Stem engaging portions (447, 448) of first and second grasp segments (438, 440) along with spacer 480 may be configured to adjustably engage control stems of various sizes. In one exemplary (and non-limiting) implementation, control stem 434 may comprise a "D" stem having a generally curved surface and a flat, linear surface extending along it shaft. As such, if configured to engage a "D" stem, knob 410 may be designed to include a complimentary generally curved surface and a flat, linear surface which are aligned with the respective surfaces of control stem 434.

FIG. 9I is an exemplary illustration depicting engagement of first and second grasp segments (438, 440) with control stem 434 when knob 410 is unlocked and depressed by a person (e.g., FIG. 9H). Stem engaging portions (447, 448) of first and second grasp segments (438, 440) slide (downward) in the direction of arrow "C" (e.g., FIG. 9H), when the lock mechanism 436 is unlocked, and knob body 412 is depressed. More particularly, lower portions of stem engaging portions (447, 448) slide into inwardly-tapered surfaces of spacer 480. This urges stem engaging portions (447, 448) into engagement with control stem 434.

Stem engaging portions (447, 448) may each have the same corresponding outer diameter. However, as illustrated, stem engaging portion 447 may have a different internal shape than that of stem engaging portion 448. For instance, stem engaging portion 447 may have a circular or concave inner profile, while stem engaging portion 448 may have a flat inner profile. As stem engaging portions (447, 448) slide into the inwardly-tapered surfaces of spacer 480, they wedge against control stem 434 and prevent independent rotational movement of control stem 434. Thus, rotation of knob 410 results in a corresponding motion of control stem 434.

FIG. 9J is an exemplary illustration depicting use knob 410 with control stems of varying size (e.g., control stems 434a, 434b, 434c). Spacers (480a, 480b, 480c) of various sizes may be used, each having an inside diameter that corresponds to the outer diameters of control stems (434a, 434b, 434c), respectively. While the outer diameter of spacers (480a, 480b, 480c) are similar, the inner diameter, height, and/or taper angle of inwardly-tapered surfaces of spacers (480a, 480b, 480c) may vary. As such, knob 410 may be used with control stems of various sizes. It should be understood that other control stem coupling means may also be implemented as discussed herein.

Figure 10A:
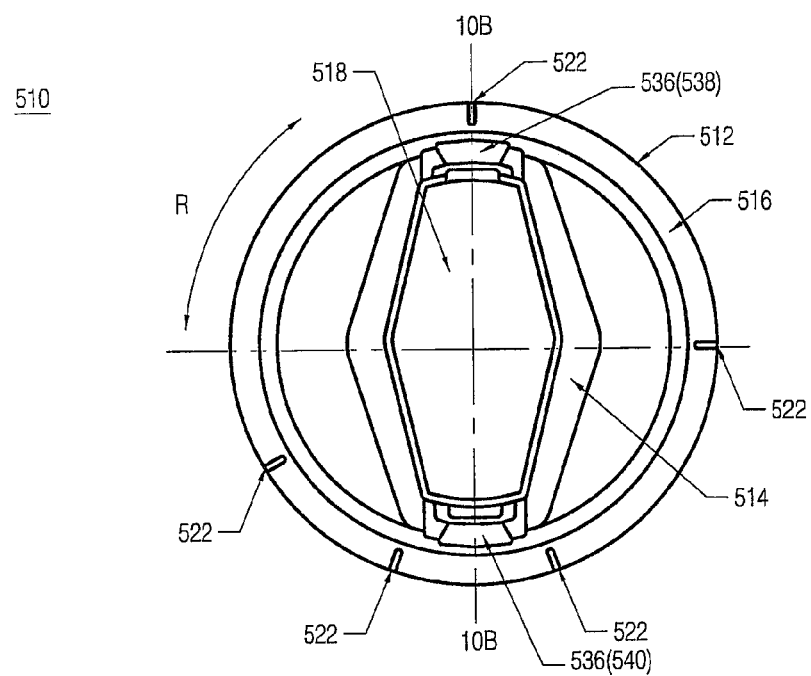
FIG. 10A is an exemplary illustration of a top view of a control knob, according to a third embodiment of the invention.

FIG. 10A is an exemplary illustration of a top view of control knob (or knob) 510 according to a third embodiment of the invention. In one implementation, control knob 510 comprises a body 512 and a lock mechanism 536. Body 512 may comprise a grasp portion 514 which is configured to be manually manipulated by a person, and a mount portion 516. mount portion 516 may be configured for mounting knob 510 to an object such as, for example, a control stem or other structure (e.g., on an appliance) and/or may be attached to body 512 (for rotating with body 512).

As will be described in greater detail herein, lock mechanism 536 (and its constituent components) acts as a safeguard by biasing knob 510 in a (default or natural) locked position, thereby preventing knob 510 from engaging a control stem or other structure 534 (e.g., on an appliance). This prevents knob 510 from rotating in either of the directions depicted by arrow "R." Grasp portion 514 includes center portion 518.

Figure 10B:
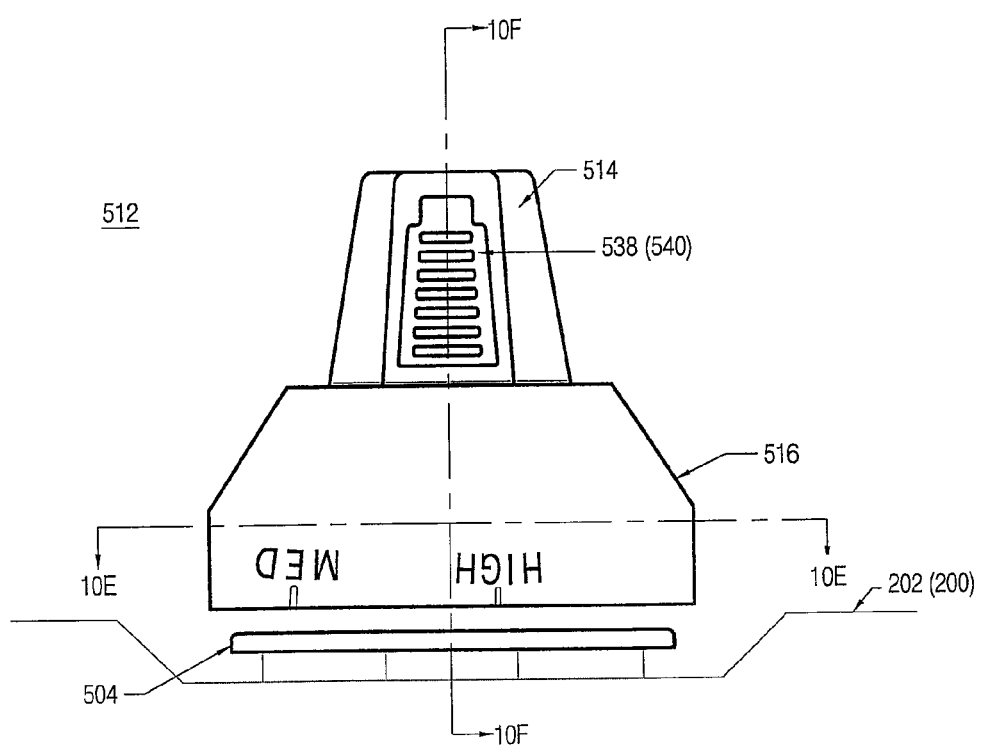
FIGS. 10B-10C are exemplary illustrations of side views of the control knob of FIG. 10A viewed along axis 10B-10B and axis 10C-10C, respectively.
Figure 10C:
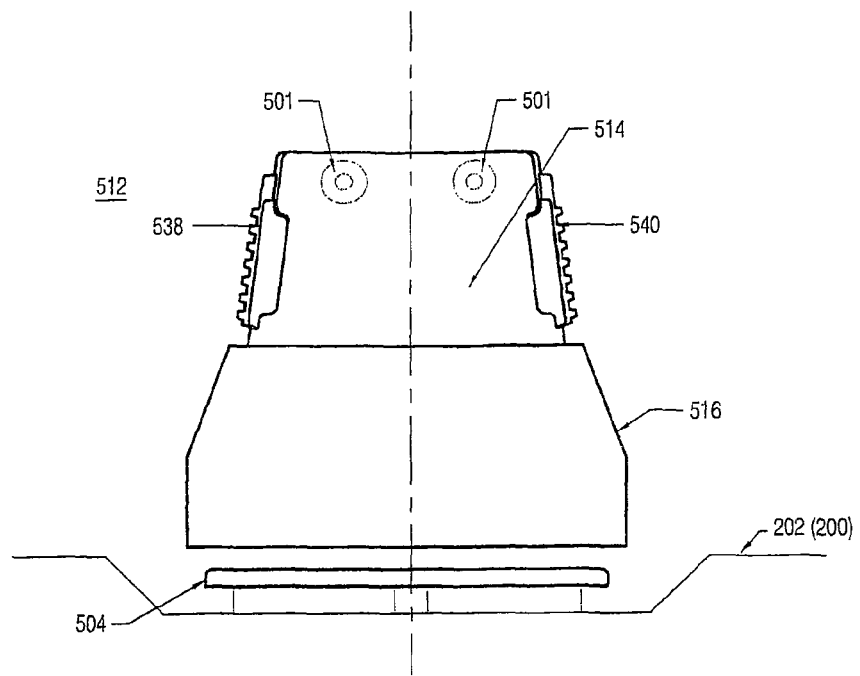

In one implementation, knob body 512 may be fabricated in two or more pieces, for instance, by molding, and later coupled together via connecting portions 501 (FIG. 10C). Connecting portions 501 on corresponding pieces of knob body 512 may "snap" together, for example. Alternatively (or additionally), fasteners or adhesive may be used. Knob 510 may have, in one non-limiting implementation, a 2.4 inch diameter. It should be understood that the materials and manufacturing methods for fabricating knob 510 and its components may vary (and may include those described above with regard to control knob 10 and control knob 410), and should therefore not be limiting. In addition, control knob 510 and each of its components should not be limited by dimension (and may include those dimensions described above with regard to control knob 10 and control knob 410).

Similar to control knobs (10, 410) described above, one or more markings 522 may be provided on mount portion 516 of knob 510. Markings 522 may correspond to various settings for appliance 200 that may be controlled by knob 510. As shown, knob 510 is provided with hash markings 522.

FIGS. 10B-10C are exemplary illustrations of side views of knob 510 viewed along axis 10B-10B and axis 10C-10C (of FIG. 10A), respectively. In some implementations, one or more knobs 510 may be similarly utilized to control various settings of a cooking appliance 200, such as a stove (or range), similar to that shown in FIG. 2. An escutcheon plate 504 and washers may be provided between a back side of the knobs 510 and a surface of appliance 200.

Figure 10D:
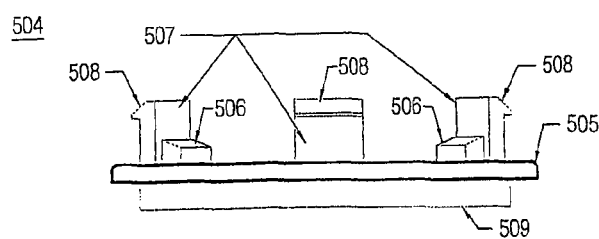
FIG. 10D is an exemplary illustration of a side view of an escutcheon plate that may be used with the control knob, according to an aspect of the invention.

FIG. 10D is an exemplary illustration of a side view of escutcheon plate 504 that may be used with knob 510. Escutcheon plate 504 may include a circular base portion 505 that may be affixed to appliance 200, for instance, with an adhesive and/or fasteners (e.g., screws, rivets, etc.). In one implementation, base portion 505 may be attached to appliance 200 with double-sided heat resistant tape. Base portion 505 may alternatively or additionally include one or more "punch-out" or "break" portions (not shown), which may be removed to permit fasteners to pass therethrough to attach to a portion (e.g., a surface) of appliance 200. In other implementations, base portion 505 may be integrally fabricated with front-facing surface (or other surfaces) of appliance 200.

A plurality of locking teeth 506 depend from a top of base portion 505. As shown, a number of locking teeth 506 (e.g., two) are positioned in a spaced-apart relationship (e.g., 180 degrees apart), corresponding to locations of first and second grasp segments (538, 540). Other locking tooth configurations may be utilized.

When lock mechanism 536 is engaged, lower depending locking teeth (545, 546) of first and second grasp segments (538, 540) are engaged with the locking teeth 506 so as to maintain knob 510 in a (default or natural) locked position, and to prevent knob 510 from rotating and engaging a control stem or other structure 534 (e.g., on an appliance). As depicted, locking teeth 506 are substantially angled in an upward and outward direction. Other tooth designs may also be utilized.

Projecting from the top of base plate 505 are a plurality of tabs 507 for attaching knob 510 to escutcheon plate 504. Although three of such tabs 507 are shown, any number of tabs 507 might be used. Tabs 507 may be equally spaced (radially) so as to more evenly distribute forces between knob 510 and escutcheon plate 504 when attached. Escutcheon plate 504 has a central opening (or void) 509 for accommodating control stem (or other structure) 534. Tabs 507 engage with corresponding lip 520 of body 512 to couple body 512 to escutcheon plate 504.

According to an aspect of the invention as shown in FIG. 10A, for example, lock mechanism 536 of control knob 510 is attached to body 512 and comprises a first (right) grasp segment 538 and a second (left) grasp segment 540. First grasp segment 538 and second grasp segment 540 may be disposed at least partially about the periphery of body 512 of knob 510. First grasp segment 538 and second grasp segment 540 may be provided on either side of center portion 518, for example, spaced 180 degrees apart. Other configurations may be utilized. First grasp segment 538 and second grasp segment 540 may comprise two separate segments which are disposed at least partially about the periphery of knob 510. Some portion (or all) of the external surfaces of first grasp segment 538 and second grasp segment 540 may be ribbed, knurled, etc. to facilitate grasping and/or manipulation of the grasp segments.

In some implementations, lock mechanism 536 may be configured as a "dual locking" release mechanism, in which both first grasp segment 538 and second grasp segment 540 must be depressed together to disengage lock mechanism 536. First grasp segment 538 includes body portion 543 and lower depending locking tooth 545. Similarly, second grasp segment 540 includes body portion 544 and lower depending locking tooth 546. First grasp segment 538 and second grasp segment 540 of lock mechanism 536 are configured for movement with respect to a body 512 of knob 510. First grasp segment 538 and second grasp segment 540 may be pressed or moved by one or more of a person's fingers and/or thumb. Such movement may include, for instance, lateral or pivotal movement of first and second grasp segments (538, 540) with respect to body 512. Other movement of first and second grasp segments (538, 540) may also be possible to control lock mechanism 536, such as rotational movement, longitudinal movement, or a combination of directional movements. As shown, first and second grasp segments (538, 540) are configured slide laterally inward (e.g., toward the center of body 512). In one implementation (as shown), body portions (543, 544) of first and second grasp segments (538, 540) may act as levers to transfer force to locking teeth (545, 546), respectively.

A guide 590 may be provided as part of knob 510 to assist in guiding first grasp segment 538 and second grasp segment 540 toward center portion 518. Guide 590 may include walls or sleeve elements formed in body 512 that constrain movement of grasp segments (538, 540) in substantially one direction only.

First grasp segment 538 and second grasp segment 540 may be depressed inwardly in a direction toward the center of body 512 of knob 510, as indicated by the illustrated "B" arrows. A spring 541 biases first grasp segment 538 and second grasp segment 540 in an outward direction. As shown, a single coil spring 541 is positioned on support 542. However, it will be appreciated that each grasp segment (538, 540) could have its own spring, and that other resilient biasing elements may be used (e.g., leaf spring, compression spring, torsion spring, elastic bands, etc.). When a pressing force is removed, first grasp segment 538 and second grasp segment 540 will return to the locked position via spring 541. To facilitate movement of the first grasp segment 538 and second grasp segment 540, roller bearing units (527, 528) may be provided. Bushings, sheaves, and/or other friction reduction elements (e.g., coatings) may also be used.

A ring element 560 is position in the underside of body 512. Ring element 560 couples body 512 of knob 510 to escutcheon plate 504. Ring element 560 may be positioned underneath body 512 of knob 510. As shown in FIG. 10F, for instance, ring element 560 may be coupled to the underside of mount portion 516 of body 512. However, it should be appreciated that ring element 560 may be coupled to other portions of body 512. In some instances, ring element may be integrally formed with body 512, such as by molding. Ring element 560 may alternatively be affixed or otherwise fastened to the inside surface of body 512. A sleeve 563 depends from an inner portion of ring element 560. In some instances, sleeve 563 may be integrally formed with ring element 560 or otherwise attached thereto. Sleeve 563 is configured to engage a control stem coupling element 580, connected to control stem 534, when lock mechanism 536 is in an unlocked position and body 512 is pressed downward. Details of implementations of sleeve 563 and stem coupling 580 are discussed in greater detail below.

Figure 10E:
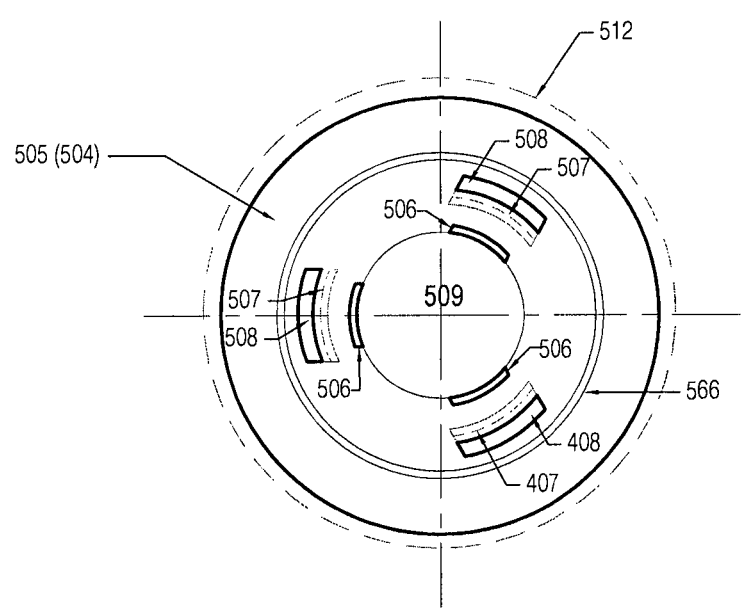
FIG. 10E is an exemplary illustration of a cross-sectional view of the control knob viewed along axis 10E-10E as shown in FIG. 10B.
Figure 10F:
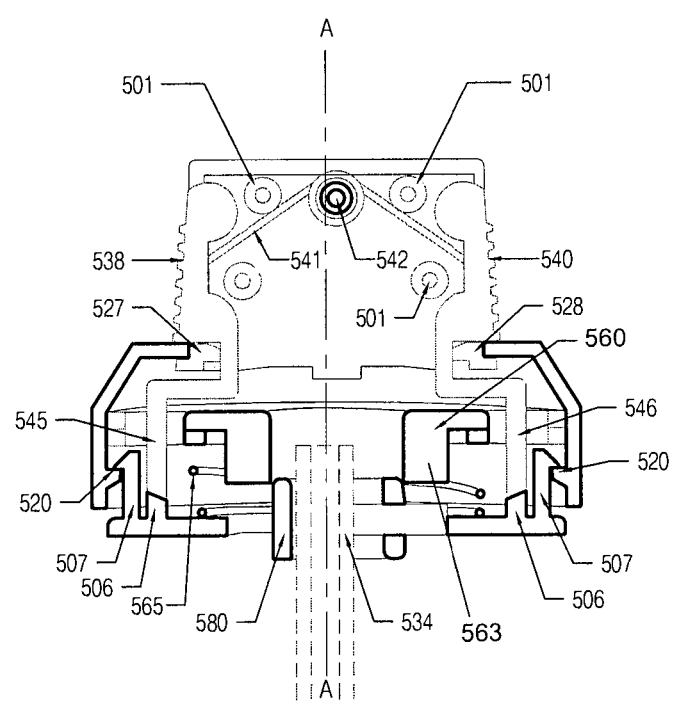

FIG. 10E is an exemplary illustration of a cross-sectional view of knob 510 viewed along axis 10E-10E (of FIG. 10B). In some implementations, to install knob 510, knob body 512 may be pressed toward escutcheon plate 504, such that tabs 507 engage inner lip 520 of body 512. This may, for instance, comprise a "snap" fit. In one implementation, the distal tip 408 of tabs 407, for example, may include an angled projection which enables the tabs to snap over inner lip 520 (having a similar configuration), but not be readily removed therefrom. A large force, for instance, may be necessary for tabs 507 to disengage entirely from inner lip 520 to remove knob body 512 from escutcheon plate 504. When lock mechanism 536 is in the unlocked position (FIG. 10F), knob 510 can rotate and/or move longitudinally with respect to escutcheon plate 504. In some instances, knob body 512 may need to be depressed toward escutcheon plate 504 so that tabs 507 are removed from frictional contact with inner lip 520 (generated in part by spring 565) to enable knob body 512 to freely rotate. Ring element 560 may include slots or other openings 564 to accommodate lower depending locking teeth (545, 546) of first and second grasp segments (538, 540).

A spring 565 is positioned between escutcheon plate 504 and ring element 560 to bias knob body 512 away from escutcheon plate 504. Spring 565 may comprise, for instance, a compression spring, although other resilient elements might also be used. As illustrated, a lip 566 may be formed in the lower surface of ring element 560 to hold compression spring 565 in place.

Figure 10G:
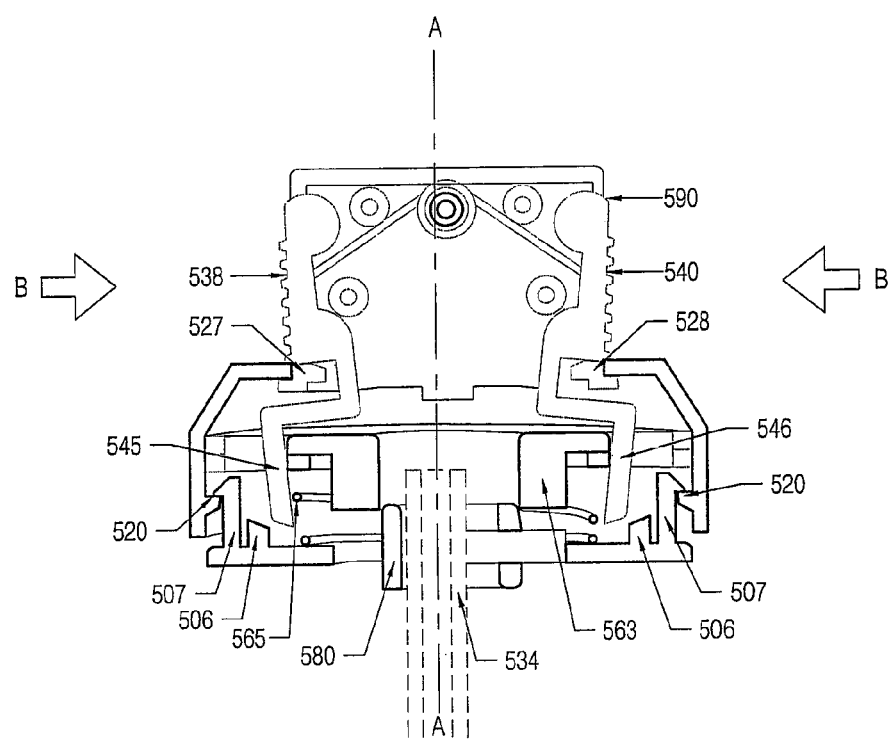
Figure 10H:
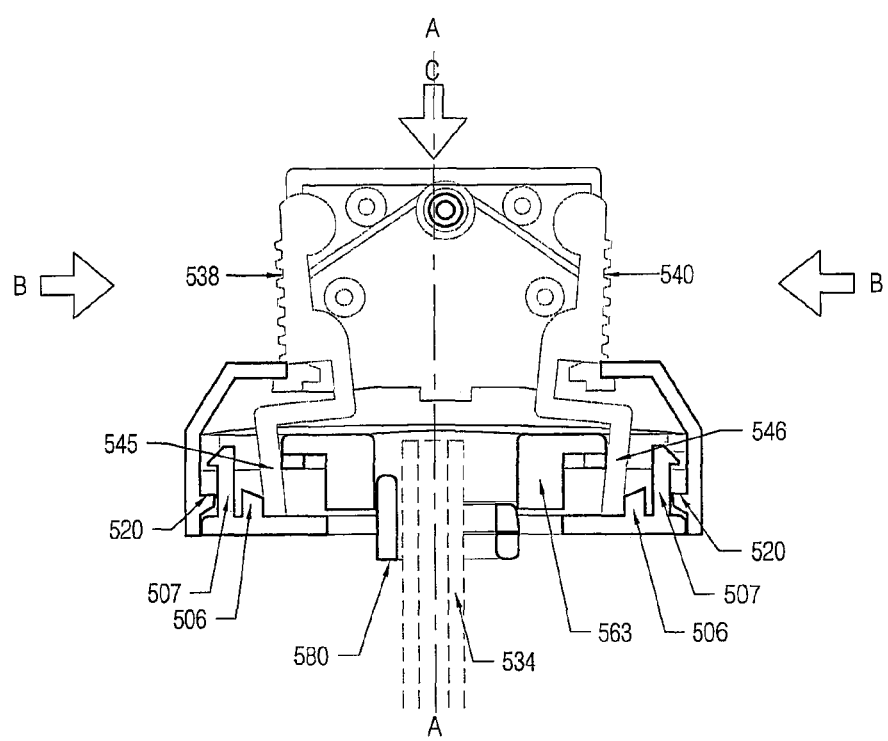

FIGS. 10F-10H are exemplary illustrations of cross-sectional views of knob 510 viewed along axis 10F-10F (of FIG. 10B), for various states of operation of knob 510. First grasp segment 538 and second grasp segment 540 of lock mechanism 536 are configured for movement between a locked position (e.g., FIG. 10F) and an unlocked position (e.g., FIG. 10G). Once unlocked, body 512 is configured to move in a longitudinal direction along axis A-A and/or rotate (about axis A-A) to a control stem engaging position (e.g., FIG. 10H). In one implementation, first grasp segment 538 and second grasp segment 540 may be pressed or moved in the lateral direction by one or more of a person's fingers and/or thumb. In some implementations, guide 590 may be provided as part of knob 510 to assist in guiding first grasp segment 538 and second grasp segment 540 toward center portion 518.

When an inward force is applied to first and second grasp segments (538, 540), body portions (543, 544) and locking teeth (545, 546) also move inwardly. As such, lock engaging portions (e.g., locking teeth (545, 546)) displace inwardly and disengage from locking teeth 506 of escutcheon plate 504. In this position, body 512 of knob 510 is free to move to engage control stem (or other structure) 534. A person may have to press knob 510 inward toward appliance 200 for such engagement.

In a locked position, as shown in FIG. 10F, control stem 534 cannot be readily rotated. In some implementations (as shown), the engagement of body 512 of knob 510 with control stem 534 is effectuated by lock mechanism 536. To engage these parts, lock mechanism 536 is moved from its normally biased (or default) locked position to an unlocked position. Knob 510 may then be longitudinally and/or rotationally moved along/about axis A-A. In some cases, knob 510 may rotate up to and including 360 degrees around axis A-A in either direction, as indicated by arrow "R" in FIG. 10A. The amount of longitudinal movement of knob 510 along axis A-A may be limited based on an amount of space needed to contact and engage control stem 534. In other implementations, body 512 of knob 510 may always be engaged with control stem 534 and, as such, may be able to rotate control stem 534 as soon as lock mechanism 536 is in the unlocked position.

Knob 510 may be configured to adjustably engage control stems of various sizes. In one exemplary (and non-limiting) implementation, control stem 534 may comprise a "D" stem having a generally curved surface and a flat, linear surface extending along its shaft. As such, if configured to engage a "D" stem, knob 510 may be designed to include a complimentary generally curved surface and a flat, linear surface which are aligned with the respective surfaces of control stem 534. It should be appreciated that other control stem coupling means may also be utilized as discussed herein.

FIG. 10I is an exemplary illustration of one implementation of a control stem coupling, according to an aspect of the invention. A control stem coupling element 580 may be configured to accommodate control stems of various sizes (e.g., of various diameters). For example, control stem coupling element 580 may include a ring 581 and a plurality of set screws 582 for engaging the outer surface of control stem 534. In one implementation, each of set screws 582 may be ⅛ of an inch in diameter, although other diameters may be used. As illustrated, three set screws 582 may be positioned equidistant about ring 581 (e.g., approximately 120 degrees apart), forming a "Y-configuration." Varying numbers of set screws and/or various set screw configurations may be utilized. In one implementation, to attach control stem coupling element 580 to control stem 534, ring 581 may be slid over control stem 534, and set screws 582 tightened so as to be rotationally and longitudinally coupled to control stem 534. To remove control stem coupling element 580 from control stem 534, set screws 582 may be loosened, allowing ring 581 to slide off control stem 534. A sleeve 563 for engaging control stem coupling element 580 slides over engaging control stem coupling element 580 in a longitudinal direction.

FIG. 10J is an exemplary illustration of sleeve 563. Sleeve 563 includes a plurality of openings 564, one for each of set screws 582 of control stem coupling element 580. Openings 564 may be sized to accommodate set screws 582, and are positioned so as to generally correspond to locations of set screws 582. In a disengaged position, set screws 581 are not physically positioned within openings 564. As such, sleeve 563 is not rotationally coupled with stem 580. In an engaged position (e.g., when lock mechanism 536 is unlocked and knob body 512 is depressed), openings 564 of sleeve 563 slide down and over control stem coupling element 580 to engage set screws 582. Thus, when knob 510 is rotated, stem coupling 580 and control stem 534 will also rotate.

FIG. 10K is an exemplary illustration of an alignment jig 570 that may be used to "center" and align the control stem coupling element 580 relative to the control stem 534. Control stem coupling element 580 may, for example, first be slid over control stem 534 against appliance 200 with set screws 582 in an un-tightened state. Next, alignment jig 570 may be slid over control stern 534 to engage control stem coupling element 580. Alignment jig 570 may include a ring body 571 having an opening 572 and a plurality of pins 573 depending from a lower surface of ring body 571. Opening 572 is sized to correspond to the diameter of control stem 534 such that when alignment jig 570 is slid over control stem 534, there is no considerable "play" or lateral movement between alignment jig 570 and control stem 534. Alignment jigs 570 of various sizes may be provided for engaging control stems 534 of various sizes, but each alignment jig 570 (regardless of size) can engage the same control stem coupling element 580. For a "D" stem, for example, opening 572 will have a corresponding shape.

Control stem coupling element 580 may be manually manipulated by a person such that pins 573 of ring body 571 engage corresponding holes 585 in a top surface of control stem coupling element 580 when alignment jig 570 is slid over control stem 534 to engage control stem coupling element 580. Once ring body 571 engages control stem coupling element 580, set screw 582 may be tightened to engage control stem 534, and alignment jig 570. This ensures that control stem coupling element 580 is in alignment with control stem 534. In some instances, alignment jig 570 may be disposed of after control stem coupling element 580 has been coupled to control step 534.

It should additionally be understood that other means may be used to engage the sleeve 563 and control stem coupling element 580. For instance, any "keyed" construction may be utilized, such that when knob body 512 is depressed, sleeve 563 and control stem coupling element 580 are rotationally coupled. In one implementation, sleeve 563 may include a plurality of pins which slide into corresponding holes (e.g., 585) in control stem coupling element 580 when lock mechanism 536 is unlocked and knob body 512 is depressed. This may be similar to how alignment jig 570 engages control stem coupling element 580, for example. In one implementation, three sets of pins and holes may be equally spaced about a lower surface of sleeve 563 and an upper surface of control stem coupling element 580, respectively. It should be appreciated that the number and locations of pins and holes may vary, and that the orientation of the pins and holes may be reversed. For instance, pins may alternatively be located on control stem coupling element 580, and holes may be located on sleeve 563.

Figure 11:
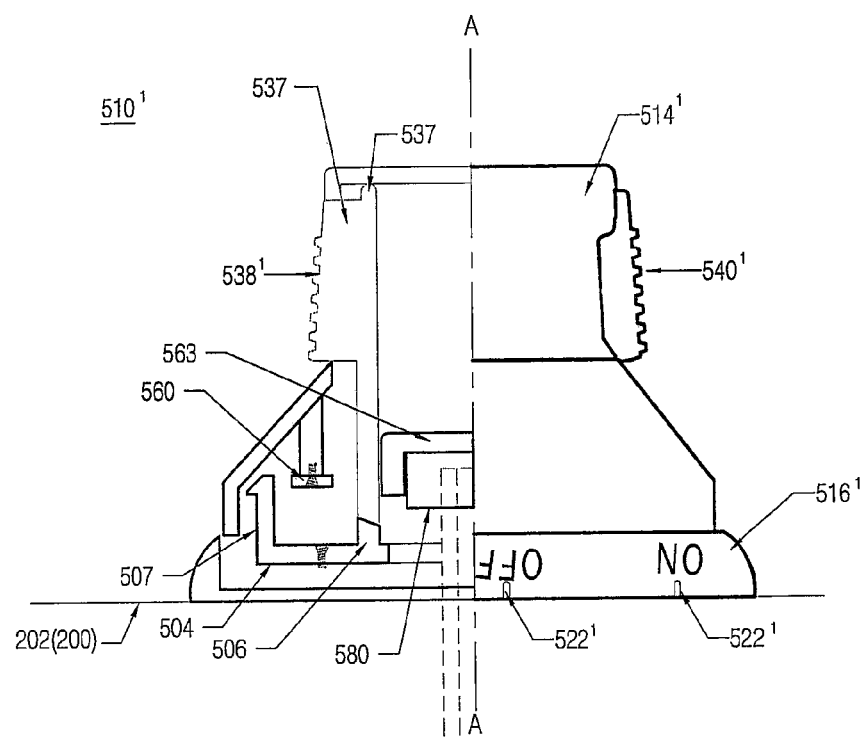
FIG. 11 is an exemplary illustration of a partial (cut-away) sectional view of an alternative implementation the control knob.

FIG. 11 is an exemplary illustration of a partial (cut-away) sectional view of an alternative implementation of a control knob 510', in accordance with an aspect of the invention.

For ease of explanation, the following description of FIG. 11 focuses primarily on the features of first grasp segment 538' and second grasp segment 540'. It should be understood that control knob 510' of FIG. 11 may include components similar to those described above with reference to FIGS. 10A-10K. Accordingly, FIG. 11 includes many of the same reference characters that correspond to the components described above.

In one implementation, knob 510' includes a first grasp segment 538' and a second grasp segment 540', each having a generally straight configuration. Pinions 537 may constrain first grasp segment 538' and second grasp segment 540' to pivotal motion only. This configuration may require less space to implement. Of course, other configurations may be implemented depending on the packaging requirements of knob 510 (510').

Further, in some implementations, mount portion 516' having marking 522' may be mounted directly to surface 202 of appliance 200. It is therefore fixed with respect to rotation of knob 510'.

The various knob embodiments disclosed herein may be adapted for use with various control stems (or other portions) of various appliances 200. Additionally, according to an embodiment, one or more conventional knobs for an appliance may be replaced with a control knob as disclosed herein. For instance, a conventional appliance knob may be removed and replaced with a knob according to an embodiment of the invention. Many conventional appliance knob are press-fit over the control stem. Some conventional appliance knobs may include set screws. Thus, to remove a conventional appliance knob, the set screw may be loosened, and the conventional knob may be pulled off of the control stem of the appliance. Next, a control knob as disclosed herein may be installed on the appliance in place of the conventional knob, as discussed above. It should be appreciated, however, that control knobs as disclosed herein may also be provided with new appliances, as well. As such, initial installation may occur at a factory, store, or other location.

Additionally, the use of orientation-specific language herein (e.g., up/down, upper/lower, above/below, top/bottom, left/right, inward/outward, etc.) is for ease of explanation with respect to the disclosed embodiments, and should in no way be viewed as limiting.

Other implementations, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A knob for controlling an appliance having a control stem, the knob comprising:
 a knob body; and
 a lock mechanism, the lock mechanism comprising:
  an escutcheon plate, configured to be mounted to a surface of an appliance,
  the escutcheon plate having an opening for accommodating the control stem of the appliance and having a plurality of locking teeth, and further being coupled to the knob body such that the knob body is configured to rotate relative to the escutcheon plate and move in a longitudinal direction relative to the escutcheon plate;
  first and second grasp segments, each being independently moveable when force is exerted thereon, the first and second grasp segments each including a locking tooth which directly engages the plurality of locking teeth of the escutcheon plate to prevent rotation of the knob body relative to the escutcheon plate and movement of the knob body in a longitudinal direction relative to the escutcheon plate; and
  a biasing member configured to force the locking teeth of the first and second grasp segments into engagement with the plurality of locking teeth of the escutcheon plate in a first, default locked state, the biasing member comprising a first linear leg, a single coil loop, and a second linear leg, the single coil loop provided around a support positioned within the knob such that the first linear leg contacts the first grasp segment and the second linear leg contacts the second grasp segment;
 wherein displacement of the first and second grasp segments causes the first and second grasp segments to move against the first and second linear legs of the biasing member, such that the locking teeth of the first and second grasp segments are disengaged from the plurality of locking teeth of the escutcheon plate resulting in a second, unlocked state, enabling the knob body to engage the control stem and to rotate and move in a longitudinal direction with respect to the control stem.

2. The knob of claim 1, further comprising a spring positioned between the escutcheon plate and the knob body to bias the knob body away from the escutcheon plate.

3. The knob of claim 1, wherein the escutcheon plate comprises a plurality of tabs which engage the knob body, the tabs being equally spaced and adjacent to an outer edge of the escutcheon plate.

4. The knob of claim 3, wherein:
the knob body includes an inner lip for coupling with the tabs of escutcheon plate;
the plurality of tabs of the escutcheon plate are configured for frictional contact with a portion of the inner lip; and
wherein the tabs are configured to be removed from frictional contact with the inner lip when the knob body is displaced in the longitudinal direction toward the escutcheon plate, thereby enabling the knob body to rotate relative to the escutcheon plate, and wherein the tabs are configured to maintain engagement with the knob body during relative displacement of the knob body and escutcheon plate.

5. The knob of claim 1, wherein the biasing member is a spring configured to force the first and second grasp segments in a direction opposite to the force exerted thereon.

6. The knob of claim 1, further comprising:
a control stem coupling element configured to couple to the control stem.

7. The knob of claim 6, further comprising:
a sleeve connected to the knob body;
wherein, when the knob body is displaced in the longitudinal direction toward the escutcheon plate, the sleeve engages the control stem coupling element such that the rotation of the knob body rotates the control stem.

8. The knob of claim 7, wherein the sleeve or the control stem coupling element comprises a plurality of pins and the other of the sleeve and control stem coupling element comprises a plurality of holes, each hole sized to receive one of the pins and positioned adjacent to one of the pins; and
wherein each pin engages a respective hole when the knob body is displaced in the longitudinal direction toward the escutcheon plate such that the rotation of the knob body rotates the control stem.

9. The knob of claim 7, wherein the control stem coupling element comprises a ring which slides over the control stem, and wherein a plurality of set screws disposed about the ring are configured to engage the control stem when tightened.

10. The knob of claim 9, wherein the sleeve comprises a plurality of openings, each of which is sized to receive one of the set screws and is positioned adjacent to one of the set screws of the control stem coupling element; and
wherein each opening of the sleeve engages with a respective set screw of the control stem coupling element when the knob body is displaced in the longitudinal direction toward the escutcheon plate such that rotation of the knob body rotates the control stem.

11. The knob of claim 1, wherein the first and second linear legs bias the first and second grasp elements in an outward direction away from the control stem and wherein the displacement of the first and second grasp elements is in an inward direction towards a center of the knob body, causing the locking teeth of the first and second grasp segments to move inwardly relative to the center of the knob body to disengage from the plurality of locking teeth of the escutcheon plate.

12. A knob for controlling an appliance having a control stem, the knob comprising:
a knob body for engaging the control stem of the appliance;
a locking means for preventing rotation of the knob body relative to a surface of the appliance and movement of the knob body in a longitudinal direction relative to the surface;
a biasing means for biasing the locking means in a first, default locked state, the biasing means comprising a first linear leg, a single coil loop, and a second linear leg, the single coil provided around a support positioned within the knob such that the first linear leg and the second linear leg contacts the locking means, the first and second linear legs biasing the locking means in an outward direction away from the control stem; and
a disengaging means for receiving a force that moves the locking means against the biasing means to move the first and second linear legs in an inward direction toward the control stem such that the locking means is moved to a second, unlocked state, enabling the knob body to engage the control stem of the appliance and to rotate relative to the surface and move in a longitudinal direction relative to the surface.

13. The knob of claim 12, further comprising:
a coupling means for coupling the knob body to the control stem of the appliance.

14. The knob of claim 12, further comprising:
a portion having marking indicia.

15. An appliance, comprising:
a control stem for controlling the appliance; and
a knob coupled to the control stem of the appliance, the knob comprising:
a knob body for engaging the control stem of the appliance;
a locking means for preventing rotation of the knob body relative to a surface of the appliance and movement of the knob body in a longitudinal direction relative to the surface;
a biasing means for biasing the locking means in a first, default locked state, the biasing means comprising a first linear leg, a single coil loop, and a second linear leg, the single coil provided around a support positioned within the knob such that the first linear leg and the second linear leg contacts the locking means, the first and second linear legs biasing the locking means in an outward direction away from the control stem; and
a disengaging means for receiving a force that moves the locking means against the first and second linear legs of the biasing means to move the first and second linear legs in an inward direction toward the control stem such that the locking means is moved to a second, unlocked state, enabling the knob body to engage the control stem of the appliance and to rotate relative to the surface and/or move in a longitudinal direction relative to the surface.

\* \* \* \* \*